United States Patent [19]
Tesar

[11] Patent Number: 5,355,743
[45] Date of Patent: Oct. 18, 1994

[54] ROBOT AND ROBOT ACTUATOR MODULE THEREFOR

[75] Inventor: Delbert Tesar, Austin, Tex.

[73] Assignee: The University of Texas at Austin, Austin, Tex.

[21] Appl. No.: 810,429

[22] Filed: Dec. 19, 1991

[51] Int. Cl.$^5$ .................. B25J 17/00; B25J 18/00; F16H 1/32
[52] U.S. Cl. .................. 74/479 BP; 74/479 BJ; 74/89.15; 475/149; 475/337; 475/341; 901/23; 901/25; 901/28
[58] Field of Search .......... 74/479 BP, 479 BJ, 89.15; 475/149, 337, 341; 901/23, 25, 28

[56] References Cited

U.S. PATENT DOCUMENTS

| | | | |
|---|---|---|---|
| 3,108,498 | 10/1963 | James et al. | 901/25 X |
| 4,492,510 | 1/1985 | Tanii et al. | 414/733 |
| 4,651,591 | 3/1987 | Wurst | 74/675 |
| 4,787,270 | 11/1988 | Suica | 74/665 |
| 4,911,033 | 3/1990 | Rosheim et al. | 901/25 X |
| 4,987,788 | 1/1991 | Bausch | 74/89.15 |

FOREIGN PATENT DOCUMENTS

| | | | |
|---|---|---|---|
| 0118012 | 9/1984 | European Pat. Off. | |
| 388207 | 9/1990 | European Pat. Off. | 475/341 |
| 3444420 | 6/1986 | Fed. Rep. of Germany | |
| 2613449 | 10/1988 | France | 901/25 |
| 57-114051 | 7/1982 | Japan | 901/25 |

OTHER PUBLICATIONS

NASA Publication Task No. 504–JSC–09709–Jun. 1975.
D. Tesar and M. Butler, "A Generalized Modular Architecture for Robotic Structures"; *Manufacturing Review*, vol. 2, No. 2, Jun. 1989.
D. Tesar, "Thirty-Year Forecast: The Concept of a Fifth Generation of Robotics—The Super Robot"; *Manufacturing Review*, vol. 2, No. 2, Jun. 1989.
Wurst, K.-H. and Klechner, J., "Articulation Drives for Industrial Robots", *Werkstattstechnik, Zeitschrift Fur Industrielle Fertigung*, 74(12:717–720 (1984), English translation.
PCT Written Opinion dated Nov. 5, 1993.
Bost, 1985, *Revue Alsthom*, 3:41–50.
The International Search Report of the Patent Cooperation Treaty dated Jul. 5, 1993.

*Primary Examiner*—Allan D. Herrmann
*Attorney, Agent, or Firm*—Arnold, White & Durkee

[57] ABSTRACT

An actuator module for inducing the relative motion of robot members joined in a robot joint includes a Ferguson epicyclic gear train, integral motor and integrated control means. The gear train comprises a plurality of base gears connected to the robot members and a plurality of planet gear carriers, each planet gear carrier having a plurality of planet gears rotatably mounted therein. A motor integrated with certain gear train components induces the rotation of the planet gear carriers about or within the base gears. Because of the Ferguson paradox, this induces the motion of base gears connected to one robot member relative to those connected to the other robot member, which in turn causes the relative motion of the robot members. The actuator module can be configured as dual substantially symmetric systems and may comprise multiple stages of epicyclic gearing.

8 Claims, 18 Drawing Sheets

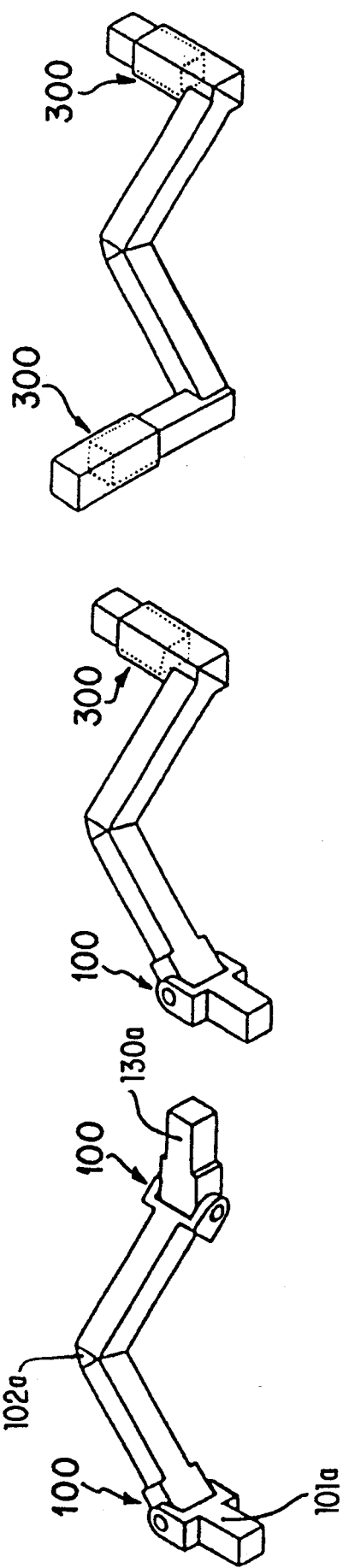

ROBOT AND ROBOT ACTUATOR MODULE THEREFOR

BACKGROUND OF THE INVENTION

The present invention relates to an actuator module for inducing the relative motion of robot members joined in a robot joint, and a robot using the actuator module. In particular, the invention relates to an actuator module comprising a Ferguson epicyclic gear train, integral motor and integrated control means (brakes, encoders, sensors, etc.).

Today's robots are designed with virtually no standardization. This results in a costly technology which cannot rapidly adapt to emerging technologies and may be obsolete before it goes to production. Modularity would do much to reduce the level of cost and would reduce the threat of obsolescence, allowing rapid changeover in favor of improved module technology. The model of the personal computer can provide a benchmark for the benefits of modularity in another system architecture. While the original computers were dedicated mainframes, each designed separately with little compatibility from one generation to the next, the personal computer is now highly modular, layered, interfaced at each level, etc. in a nearly standardized format.

The pressing need is to develop a robot architecture which can rapidly evolve in the same fashion as is now feasible for personal computers. Existing drive systems usually include encoders, brakes, motors, drive trains and joint bearings, each provided with its own housing, mounting plates, wiring interfaces, etc. Before the present invention, no thought had been given to aggressively integrating these multi-component systems into a combined whole to reduce weight, size and complexity and to increase scalability and adaptability. The architecture which results from modularity maximizes the number of physical parameters still available so that a designer has a full selection with which to design.

Of course, there are literally billions of systems which can be derived from the hundreds of design parameters available. Hence, a strategy for design must be developed which allows optimum results to occur in smaller, more addressable packages. This is the primary design argument in favor of modularity in robotics. Evolutionary changes in previous designs are presently made without having the capability to make dramatic changes which could provide substantial benefits.

Although the need for modularity and compactness has been recognized in the prior art, see, e.g., U.S. Pat. Nos. 4,738,576 and 4,062,601, these proposed solutions retain such deficiencies as separately housed motors and unnecessary complexity.

The use of epicyclic gear trains is also known in the art. See, e.g., U.S. Pat. Nos. 4,686,402; 4,492,510; and Nasa Publication JSC-09709 (June 1975). These devices are particularly suited for robotics because of their compactness (for the reduction ratios possible), efficiency (and thus back-driveability), durability and smooth operation. As with most gear trains, however, the use of an epicyclic gear train typically adds a relatively heavy structure to the robot joint assembly. The prior art, characterized by separately-housed, discrete components and long force paths, has not provided an adequate solution to this and other stumbling blocks facing the development of robot-drive technology. Finally, none of the proposed solutions combine modularity and compactness with superior redundancy and stiffness characteristics.

SUMMARY OF THE INVENTION

The present invention provides an actuator module which can be easily integrated in a series of one, two and three degree-of-freedom ("DOF") structural robot modules ( elbows, knuckles, wrists, shoulders, etc.) which can then be rapidly scaled and assembled into a full architecture of 3 to 12-DOF multilayered robot systems as might be found in multi-fingered hands, dual-arm robots, walking machines, micro-surgery devices and the like. The actuator modules of the present invention can be treated as separate entities which can be designed in-depth, provided with generic interfaces, classified in terms of scaling rules, etc. Once these packages exist in optimum units, they can then be integrated into a system which then will contain far fewer available design parameters and therefore becomes much more tractable to the designer. This versatility means that the designer will be able to consider a much broader range of options and would more likely take a top-down approach.

In addition to enhanced modularity, the invention offers many other advantages over existing robot actuators. Specifically, the actuator module of the present invention is one third to one-tenth lighter, three to five times smaller, three to ten times stiffer, with two to four times fewer interfaces, three times fewer bearings, and twice the redundancy.

These advantages are achieved through an actuator module featuring a Ferguson epicyclic gear train, motor and control means, with the motor and control means preferably being integrated with selected gear train components. The actuator module may be of frameless construction, being adapted to mate with robot members designed to enclose the gear train and motor. Alternatively, the gear train may be integrated with the housing for the gear train and motor.

In a first embodiment of the invention, the gear train comprises a first base gear connected to a first robot member, a second base gear connected to a second robot member, a planet gear carrier, and a plurality of planet gears rotatably mounted in the planet gear carrier and adapted to mesh with both the first and second base gears, with the base gears and planet gear carrier all rotating about the same central axis. The base gears may be ring (internally-toothed) gears, wherein the planet gears rotate within the base gears, or sun (externally-toothed) gears, wherein the planet gears rotate outside the base gears.

In this first embodiment, a d.c. motor having a pair of permanent magnets is integrated with the gear train components, with an armature connected to the planet gear carrier and a plurality of magnets connected to one of the base gears. An alternative embodiment features an armature connected to one of the base gears and a plurality of magnets connected to the planet gear carrier.

The first and second base gears are formed with a different number of teeth. Because of this difference in the geometries of the two base gears, the rotation of the planet gears about the base gears' circumferences induces relative motion between the two base gears, i.e., one base gear rotates relative to the other. This phenomenon is known as Ferguson's paradox, and an epicyclic gear train utilizing this principle is referred to herein as a Ferguson epicyclic gear train. The resulting relative rotation of the base gears represents a significant reduction in rotational speed from the rotational speed of the motor (and the rotational speed of the planet gear carrier). The relative motion of the base gears is translated to the robot members and is adaptable to form a variety of robot joints, including elbow joints, joints for continuous rotational motion and joints for linear motion. The use of a Ferguson epicyclic gear train provides a much shorter force path than conventional epicyclic drives, resulting in greater stiffness and compactness.

Added benefits such as redundancy, stability and superior design flexibility may be achieved through a dual substantially symmetric gear train and motor system. In a second embodiment of the invention, the actuator module features a pair of outer base gears, a pair of inner base gears located axially between the outer base gears, and a pair of planet gear carriers substantially perpendicular to the central axis, with the outer base gears being connected to one robot member and the inner base gears being connected to the other robot member. The planet gears of each planet gear carrier mesh with one outer base gear and one inner base gear. In this embodiment, the actuator module also comprises a dual motor system, having two armatures and two sets of magnets. As in the unitary system, an armature is connected to each planet gear carrier and is disposed adjacent a plurality of magnets connected to one of the base gears. The actuator module thus comprises a dual symmetric system. Symmetry of two drive trains reduces torsional deformations and thus allows the use of much lighter bearings and structural elements within the actuator. The duality of this configuration enhances the reliability and design flexibility of the actuator module. Separate control means may be provided for each gear train/motor system and the two systems may be adapted to operate independently, such as through the use of a dog-leg clutch assembly.

In other embodiments of the present invention, multiple epicyclic stages may be provided to accommodate greater gear reduction needs. In particular, each half of the dual gear train and motor system described in the second embodiment may be adapted to comprise two stages of epicyclic gearing, with two sets of inner and outer base gears, two sets of planet gears, and two planet gear carriers. A variety of drive means may be used in the present invention, including electric motors, hydraulic motors and pneumatic motors, with the of type of motor being selected according to the requirements of the particular application.

BRIEF DESCRIPTION OF THE DRAWINGS

FIGS. 15a-c are 2-DOF general actuated robot knuckle joints utilizing actuator modules of the present invention.

DETAILED DESCRIPTION OF THE PREFERRED EMBODIMENTS

Figure 1:
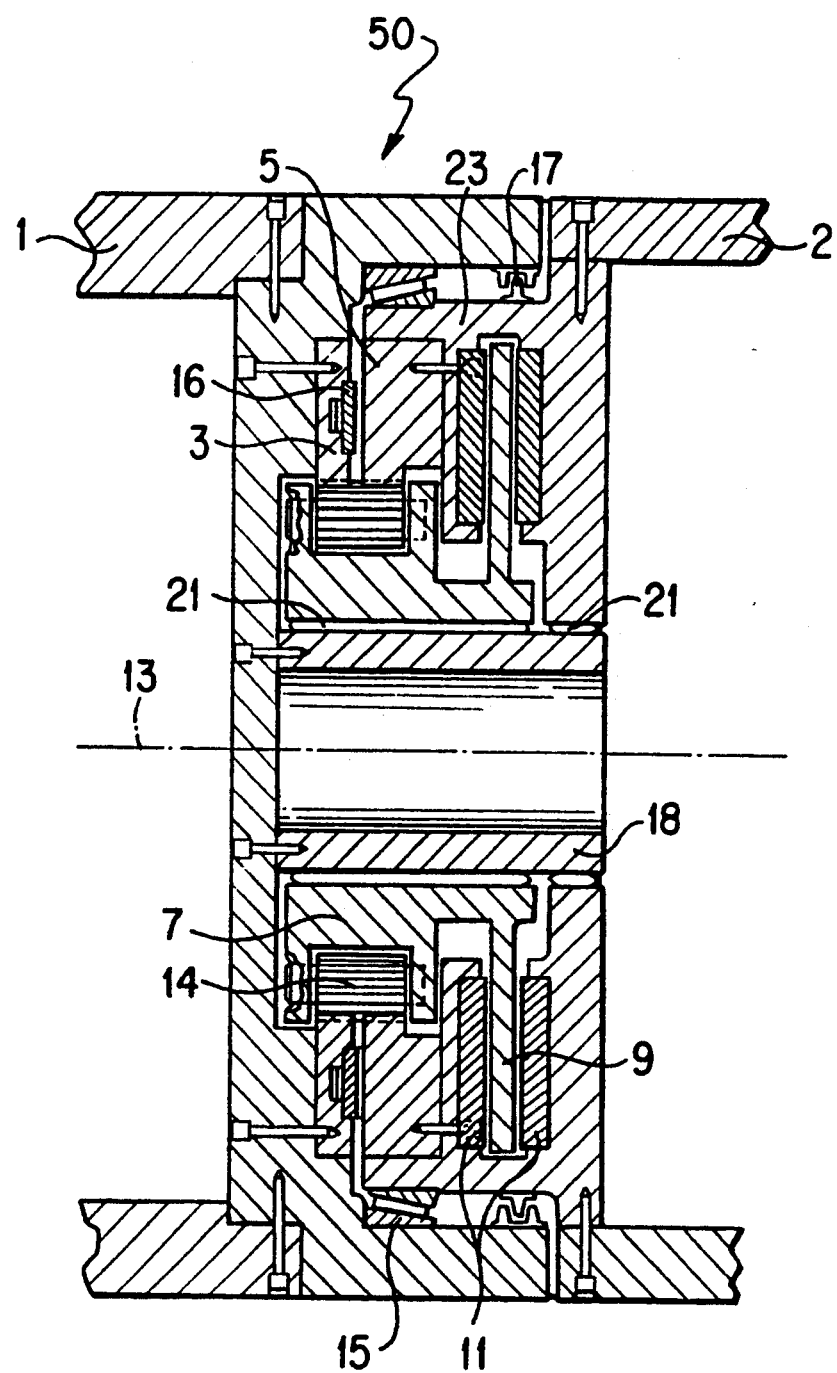
FIG. 1 is a cross-sectional view of the actuator module of the present invention featuring a single gear train/motor system mated with two robot members to form a robot joint for continuous rotation.

A first embodiment of the invention, actuator module 50, is shown in FIG. 1 and comprises a Ferguson epicyclic gear train formed by first base gear 3 detachably connected to robot member 1, second base gear 5 detachably connected to robot member 2, and planet gear carrier 7 with a plurality of planet gears 14 rotatably mounted therein, with base gears 3 and 5 and planet gear carrier 7 being horizontally disposed along a central rotational axis 13 and adapted to rotate about axis 13. Robot members 1 and 2 may be integrally connected to base gears 3 and 5, respectively, such as by forming the robot members and base gears as single components, or by welding, bolting or functionally equivalent connections. Bolted connections and other detachable connections are particularly useful for ease of assembly and interchangeability. Alternatively, robot members 1 and 2 may be movably connected to base gears 3 and 5, respectively, such as through a hinge, screw, or ball-and-socket assembly.

Figure 2:
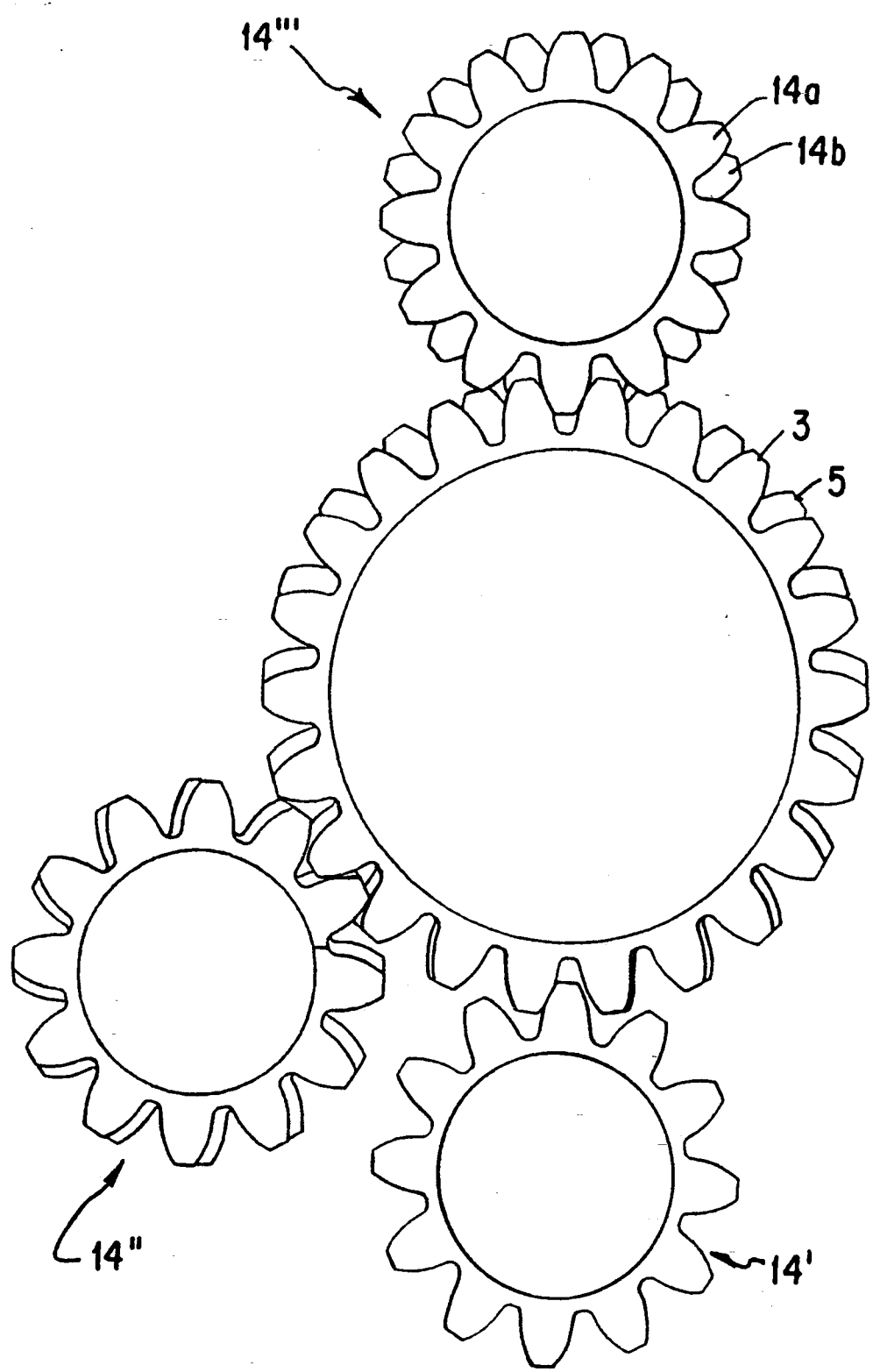
FIG. 2 is side view of the Ferguson epicyclic gear train of the present invention.

Planet gear carrier 7 comprises an annular body forming a substantially cylindrical interior space. Planet gears 14 carried by planet gear carrier 7 mesh with first base gear 3 and second base gear 5. A side view of the Ferguson epicyclic gear train of the present invention is shown in FIG. 2. Not all of the planet gears 14 are shown in FIG. 2 nor is planet gear carrier 7. As can be seen from FIG. 2, each planet gear 14 comprises two sets of teeth, one set 14a for meshing with first base gear 3 and a second set 14b for meshing with second base gear 5. The teeth sets 14a and 14b of one planet gear 14 may be axially aligned as in planet gear 14' in FIG. 2. The remainder of the planet gears 14, as illustrated by the planet gears 14" and 14''' in FIG. 2, have teeth sets 14a and 14b which are offset a given distance, the offset distance being governed by the location of the planet gear 14 on the planet gear carrier 7 and the difference in the number of teeth of base gears 3 and 5.

As planet gear carrier 7 and planet gears 14 rotate about base gears 3 and 5, rotation of base gear 3 relative to base gear 5 is induced by the different in the number of teeth of base gears 3 and 5. This phenomenon is known as Ferguson's paradox. Although the Ferguson epicyclic gear train of the present invention can operate with only one planet gear 14 mounted in planet gear carrier 7, the use of as many planet gears as space and the tooth requirements of Ferguson's paradox will permit proportionally increases drive train stiffness and load carrying capacity and distributes tooth wear and deformation.

Planet gear carrier 7 is connected to motor rotor 9, which may be a pancake armature disk and may be formed integrally with planet gear carrier 7 as a single component or may be securably fastened to planet gear carrier 7 for ease of assembly or manufacture as where different materials are needed for each component.

In this embodiment, base gears 3 and 5 are shown as ring (internally-toothed) gears. First base gear 3 is connected to central shaft 18, central shaft 18 being disposed in the space formed by planet gear carrier 7 and aligned with central rotational axis 13. Second base gear 5 is connected to motor stator 11 by means of motor stator arm 23, motor stator arm 23 preferably being connected to second base gear 5, rotatably connected to central shaft 18 and detachably connected to robot member 2. Second base gear 5 may be formed with motor stator arm 23 as a single component or these may be formed as separate components and securably fastened together for ease of assembly. Motor stator 11 comprises a set of opposing permanent rare earth magnets mounted in motor stator arm 23, each set being made up of one or more magnets. Motor stator 11 may be configured to receive motor rotor 9 in a space formed within motor stator 11. In this fashion, an electric motor is formed. In operation, the electromechanical force generated by the motor causes motor rotor 9, and thus planet gear carrier 7, to rotate about central rotational axis 13. As planet gear carrier 7 rotates, the planet gears 14 rotatably mounted therein rotate both about their own individual axes and about the inner circumference of first base gear 3 and second base gear 5, i.e., about central rotational axis 13.

The actuator module of the present invention may also be used with other types of motors, including but not limited to hydraulic and pneumatic motors, depending upon desired performance characteristics or other constraints.

Because first base gear 3 is formed with a different number of teeth than second base gear 5, the rotation of planet gear carrier 7 within base gears 3 and 5 induces first base gear 3 to rotate about axis 13 in a direction relative to second base gear 5, this being the phenomenon of Ferguson's paradox. This relative motion is transmitted to the robot members 1 and 2 by virtue of the connection of robot member 1 with first base gear 3 and the connection of robot member 2 with second base gear 5.

Also shown in FIG. 1 are brakes 16 and position sensors 17, which allow for the control of the relative motion of the drive train components. Potentiometers, tachometers, resolvers, hall effect sensors, torque meters and other measuring and sensing devices be integrated into the actuator module to improve the control characters. Needle bearings 21 and tapered roller bearings 15 provide for enhanced stiffness and reduced friction.

Figure 3:
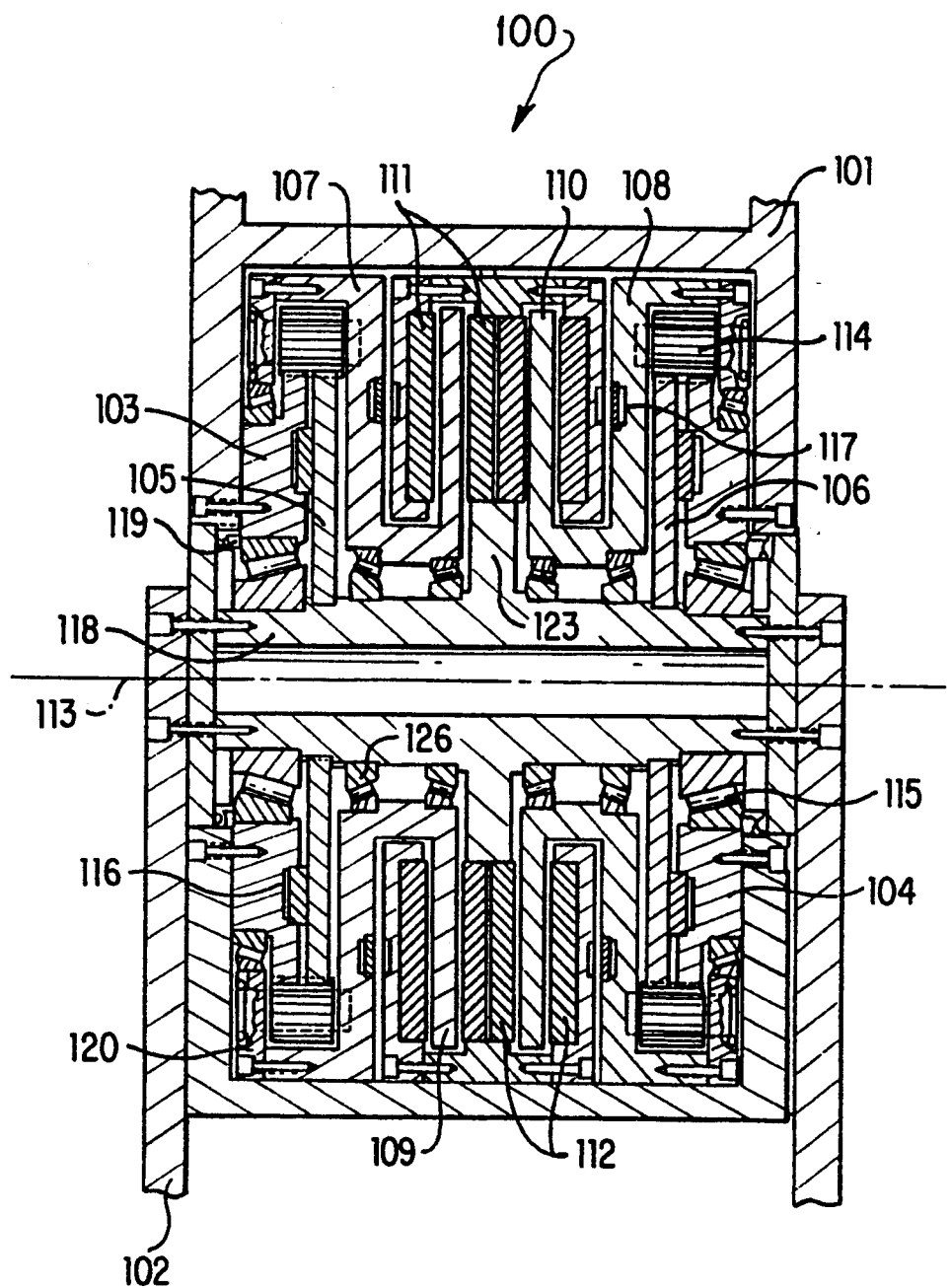
FIG. 3 is a cross-sectional view of the actuator module of the present invention featuring a dual gear train/motor system mated with two robot members to form an elbow joint.
Figure 4:
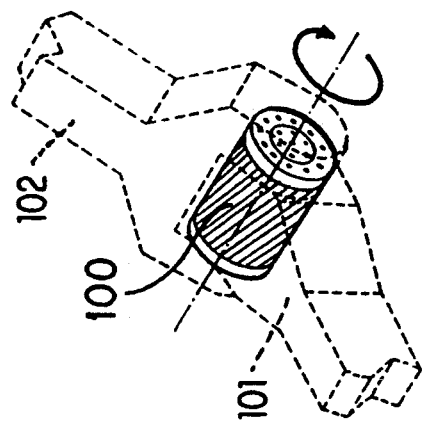
FIG. 4 is an isometric view of the actuator module of FIG. 3.

Actuator module 100, as shown in FIG. 3, features a dual substantially symmetric gear train/motor system mated with a first robot member 101 and second robot member 102 to form an elbow joint, a one degree-of-freedom joint wherein the axis of rotation of the gear train and motor components has a range of about 270° about centerline axis of the attached robot members 101 and 102. This configuration is also shown in FIG. 4.

Figure 5:
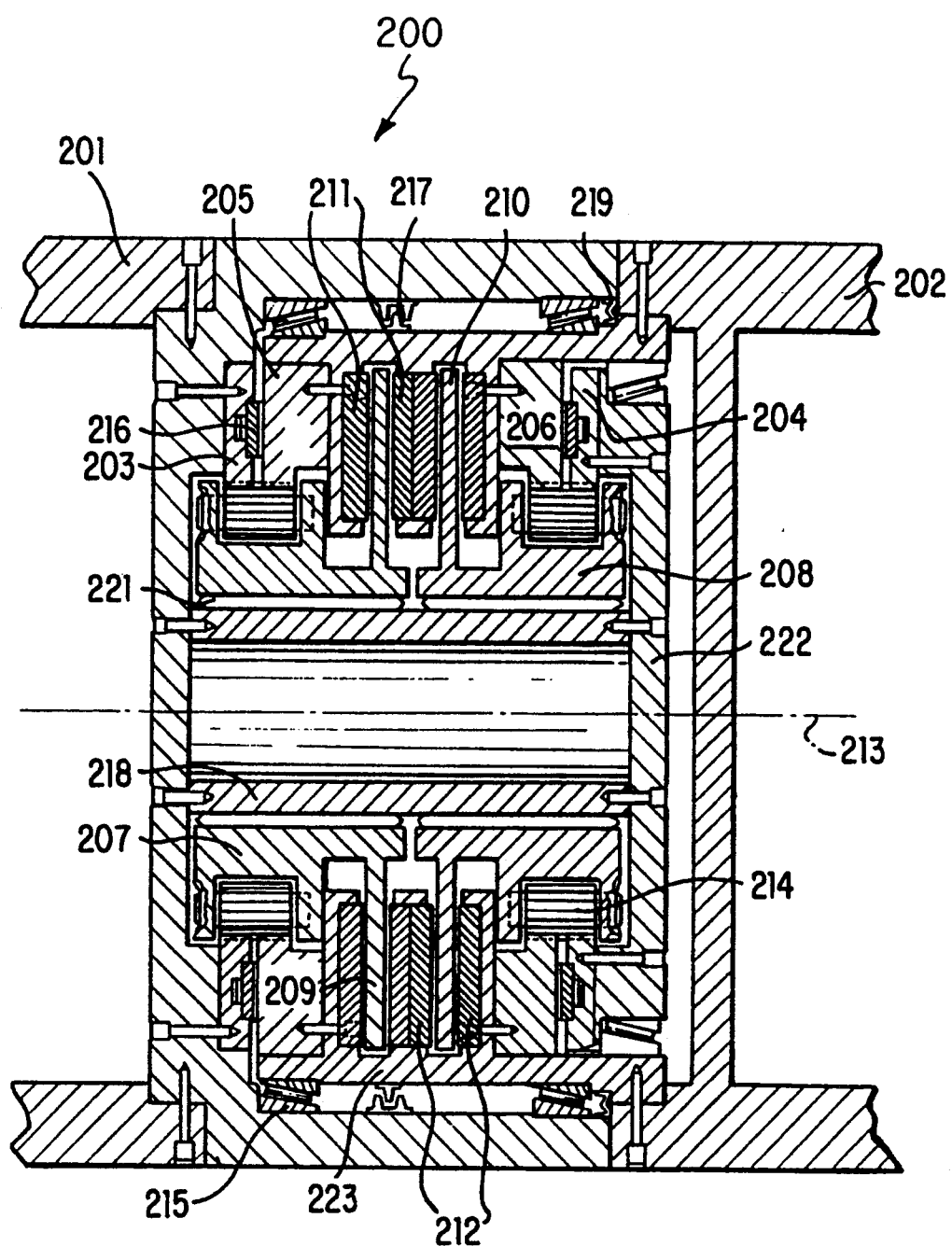
FIG. 5 is a cross-sectional view of the actuator module of the present invention featuring dual gear train/motor system mated with two robot members to form a robot joint for continuous rotation.

Actuator module 200, as shown in FIG. 5, features a dual substantially symmetric gear train/motor system mated with a first robot member 201 and second robot member 202 to form a robot joint wherein the gear train and motor components rotate about the centerlines of the attached robot members 201 and 202. This configuration, also shown in FIG. 6, essentially doubles the gear train/motor system shown in FIG. 1. In a similar fashion, actuator module 100 could be reduced to a single system configuration. While the configurations of actuator module 200 shown in FIGS. 5 and 6 describe a single DOF joint, with the robot member centerlines being aligned with the axis of rotation of the actuator module, actuator module 200 may also be adapted to form a continuously rotatable elbow joint, as shown in FIG. 14c, with the robot member centerlines being perpendicular to the actuator module's axis of rotation.

Figure 8:
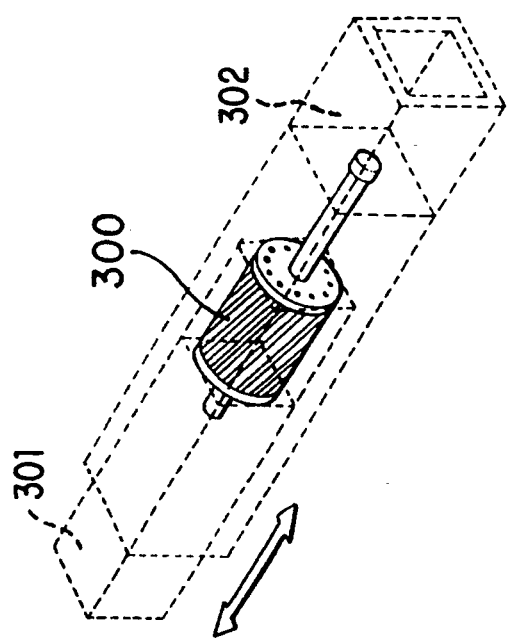
FIG. 8 is an isometric view of the actuator module of FIG. 7.
Figure 7:
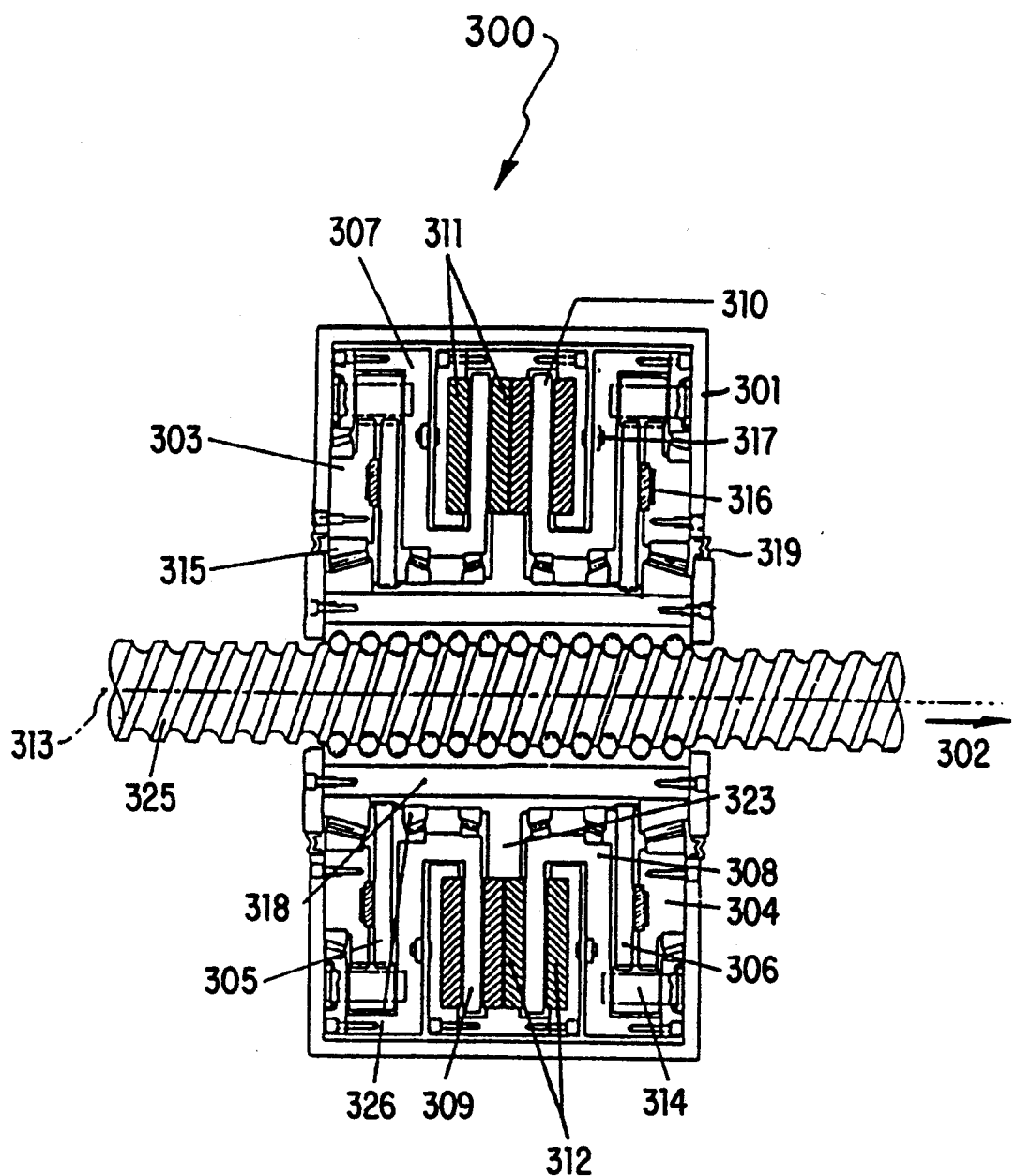
FIG. 7 is a cross-sectional view of the actuator module of the present invention featuring a dual gear train/motor system adapted to mate with two robot members in a ballscrew and sleeve configuration for inducing the linear motion of one robot member relative to the other.
Figure 9:
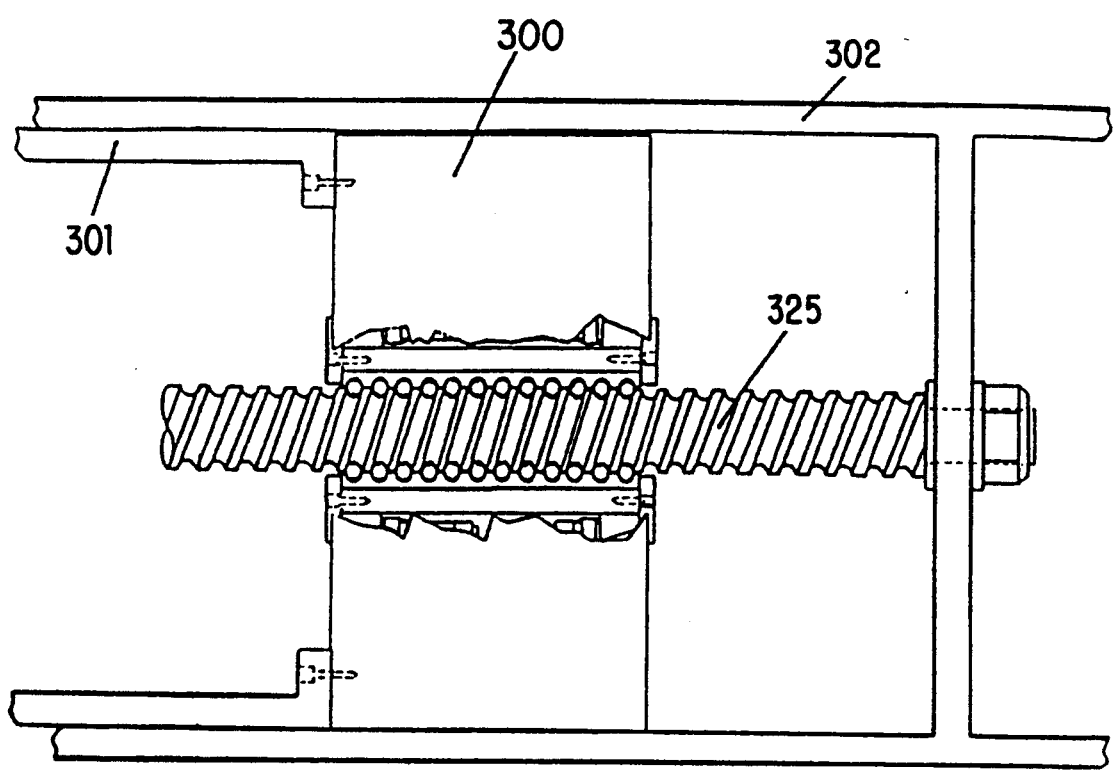
FIG. 9 is a side view of the ballscrew and sleeve configuration of FIGS. 7 and 8.

Actuator module 300, as shown in FIG. 7, features a dual substantially symmetric gear train/motor system mated with a first robot member 301 and second robot member 302 in a ballscrew and sleeve assembly for inducing the linear motion of robot member 302 relative to robot member 301. As with actuator models 100 and 200, actuator model 300 could also be formed as a single system configuration. The use of this actuator module with a ballscrew and sleeve assembly is shown in FIG. 8 and the assembly itself is shown in more detail in FIG. 9.

The components of actuator modules 100, 200 and 300 shown in FIGS. 3, 5, and 7 are essentially the same, thus allowing the use of a common numbering system for all three figures that designates the individual components of each figure with the first digit of the module number. Thus, for module 100, all component numbers begin with "1," module 200 components begin with a "2, " and module 300 components begin with a "3". Each of actuator modules 100, 200 and 300 comprises a Ferguson epicyclic gear train formed by an outer base gear pair comprising first outer base gear (103, 203, 303)

and second outer base gear (104, 204, 304), an inner base gear pair comprising first inner base gear (105, 205, 305) and second inner base gear (106, 206, 306), and planet gear carriers (107, 207, 307, and 108, 208, 308) with a plurality of planet gears (114, 214, 314) rotatably mounted therein, with the base gears and planet gear carriers being substantially perpendicular to a central rotational axis (113, 213, 313) and adapted to rotate about this axis. Planet gear carriers (107, 207, 307 and 108, 208, 308) comprise annular bodies forming substantially cylindrical interior spaces. The planet gears (114, 214, 314) of first planet gear carrier (107, 207, 307) mesh with first outer base gear (103, 203, 3 and first inner base gear (105, 205, 305), as shown in FIG. 2. Likewise, planet gears (114, 214, 314) of second planet gear carrier (108, 208, 308) mesh with second outer base gear (104, 204, 304) and second inner base gear (106, 206, 306).

Figure 6:
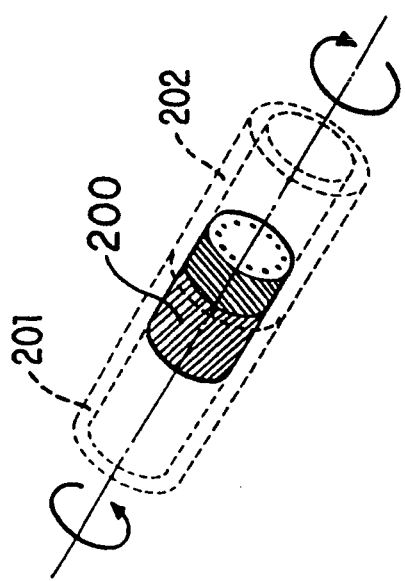
FIG. 6 is an isometric view of the actuator module of FIG. 5.

Base gears (103, 203, 303: 104, 204, 304; 105, 205, 305; and 106, 206, 306) comprise sun (externally-toothed) gears in FIGS. 1 and 6 and ring (internally-toothed) gears in FIG. 4. Outer base gears (103, 203, 303 and 104, 204, 304) are connected to robot member (101, 201, 301). This connection may be made by fastening outer base gears (103, 203, 303 and 304) directly to robot member (101, 201, 301) with a bolt circle or the like.

In actuator models 100 and 300, inner base gears (105, 305, and 106, 306) are connected to a central shaft (118, 318), central shaft 18 being aligned with central rotational axis (113, 313). Inner base gears (105, 305 and 106, 206, 306) may be formed with central shaft (118, 318) as a single component or splined to central shaft (118, 318) for assembly purposes. Integrated with central shaft (118, 318) is motor stator arm (123, 323).

In actuator module 200, inner base gears 205 and 206 are connected to motor stators 211 and 212 by means of magnet stator arm 223, motor stator arm 23 being connected to both inner base gears 205 and 206 and and motor stators 211 and 212. Inner base gears 205 and 206 may may be formed with motor stator arm 223 as an integral component or may be formed as separate components and securably fastened together for ease of assembly.

First planet gear carrier 207 is connected to first motor rotor 209 and second planet gear carrier is connected to second motor rotor 210. Motor rotors 209 and 210 may be pancake armature disks and may be formed with planet gear carriers 207 and 208 as integral components or may be securably fastened to planet gear carriers 207 and 208 for ease of assembly or manufacture where different materials are needed for each component. Planet gear carriers 207 and 208 may include annular end plates 220 to form the outer mount for planet gears 214 for ease of assembly, as shown in FIG. 1.

In actuator modules 100, 200 and 300, first motor stator (111, 211, 311) and second motor stator (112, 212, 312) each comprise a group of opposing permanent rare earth magnets mounted in motor stator arm (123, 223, 323) and are configured to receive motor rotors (109, 209, 309 and 110, 212, 312) in the spaces formed within each motor stator (111, 211, 311 and 112, 212, 312), respectively. In this fashion, dual motors are formed. In operation, the electromechanical force generated by the motor causes motor rotors 109, 209, 309, and 110, 210, 310) and thus planet gear carriers (107, 207, 307 and 108, 208, 308), to rotate about central rotational axis (113, 213, 313). Because the dual motors are driven in phase, planet gear carriers (107, 207, 307 and 108, 208, 308), rotate in the same direction. As planet gear carrier (107, 207, 307) rotates about central rotational axis (113, 213, 313), planet gears (114, 214, 314) rotatably mounted therein rotate both about their own individual axes and about the outer circumference (actuator modules 100 and 300) or inner circumference (actuator module 200) of first outer base gear (103, 203, 303) and first inner base gear (105, 205, 305), i.e., about central rotational axis (113, 213, 313). Similarly, planet gears (114, 214, 314) of second planet gear carrier (108, 208, 308) rotate both about their own axes and about the circumferences of second outer base gear (104, 204, 304) and second inner base gear (106, 206, 306) as second planet gear carrier (108, 208, 308) rotates about central rotational axis (113, 213, 313).

Actuator modules 100, 200 and 300 each feature a central shaft (118, 218, 318) aligned with central rotational axis 13. In actuator module 200, central shaft 218 serves to connect outer base gears 3 and 204. Planet gear carriers (107, 207, 307 and 108, 208, 308) rotate about central shaft (118, 218, 318) which is disposed in the interior spaces formed by planet gear carriers (107, 207, 307 and 108, 208, 308), with bearings (126, 326) (actuator modules 100 and 300) and needle bearings 221 (actuator module 200) disposed between central shaft (118, 218, 318) and planet gear carriers (107, 207, 307 and 108, 208, 308). The bearings 126, 326 and 221 at these locations, as well as the bearings (126, 326) at the interface of planet gear carriers (107, 207, 307 and 108, 208, 308) and outer base gears (103, 303 and 104, 304) of actuator modules 100 and 300, can be relatively small as they undergo almost no twisting and because the structure is symmetrical. The bearings (115, 315) disposed at the interface of central shaft (118, 318) and outer base gears (103, 303 and 104, 304) (actuator modules 100 and 300) and at the interface of the housing 222 and motor stator arm 223 (actuator module 200) are major support bearings for the mechanical structure and will need to resist complex radial and axial forces. Bearings (115, 215, 315) may also be used at the interface of other locations in actuator modules 100, 200 and 300 to reduce friction and to increase stiffness.

In each of modules 100, 200 and 300, because the outer base gears (103, 203, 303 and 104, 204, 304) are formed with a different number of teeth than inner base gears (105, 205, 305 and 106, 206, 306), the rotation of planet gear carriers (107, 207, 307 and 108, 208, 308) about or within base gears (103, 203, 303, 104, 204, 304, 105, 205, 305, and 106, 206, 306) induces the outer base gears (103, 203, 303 and 104, 204, 304) to rotate relative to inner base gears (105, 205, 305 and 106, 206, 306) this being the phenomenon of the Ferguson paradox. This relative motion is transmitted to robot members (101, 201, 301 and 102, 202, 302) by virtue of the connection of robot member (101, 202, 301) with outer base gears (103, 203, 303 and 104, 204, 304) and the connection of robot member (102, 202, 302) with inner base gears (105, 205, 305 and 106, 206, 306). In actuator modules 100 and 200, all of these connections are rigid while in actuator module 300, only robot member 301 is rigidly connected with base gears (namely, outer base gears 303 and 304.

In the ballscrew and sleeve assembly of actuator module 300, robot member 301 is slidably disposed within robot member 302, with robot member 302 essentially forming a sleeve around robot member 301. Central shaft 318 of actuator module 300 comprises a hollow shaft with an interior being adapted to mesh with a ballscrew 325, with ballscrew 325 being securably fastened to robot member 302. (Central shaft (18, 118, 218) of actuator modules 50, 100, and 200 may also be hollow as shown in FIGS. 1, 2 and 4, to achieve weight savings.) As inner base gears 305 and 306 rotate relative to outer base gears 303 and 304, central shaft 318 rotates about ballscrew 325, thus advancing the actuator module 300 and robot member 301 linearly along central rotational axis 313 while robot member 302 remains stationary, being fixed to ballscrew 325. This configuration is shown in more detail in FIG. 8.

Brakes 316 may be located between outer base gear 303 and inner base gear 305 and between outer base gear 304 and inner base gear 306 to control their relative motion. Position sensors 317 such as encoders or resolvers may be located at the interfaces of selected gear train, motor and housing components to measure their relative motion.

Because certain parts of the actuator system (encoders, magnetic pads, armature, brake pads, etc. ) should be kept relatively clean, seals along the shaft and at other volume interfaces may be required. Positive ventilation of a high pressure air supply may prove useful in some cases.

Figure 10:
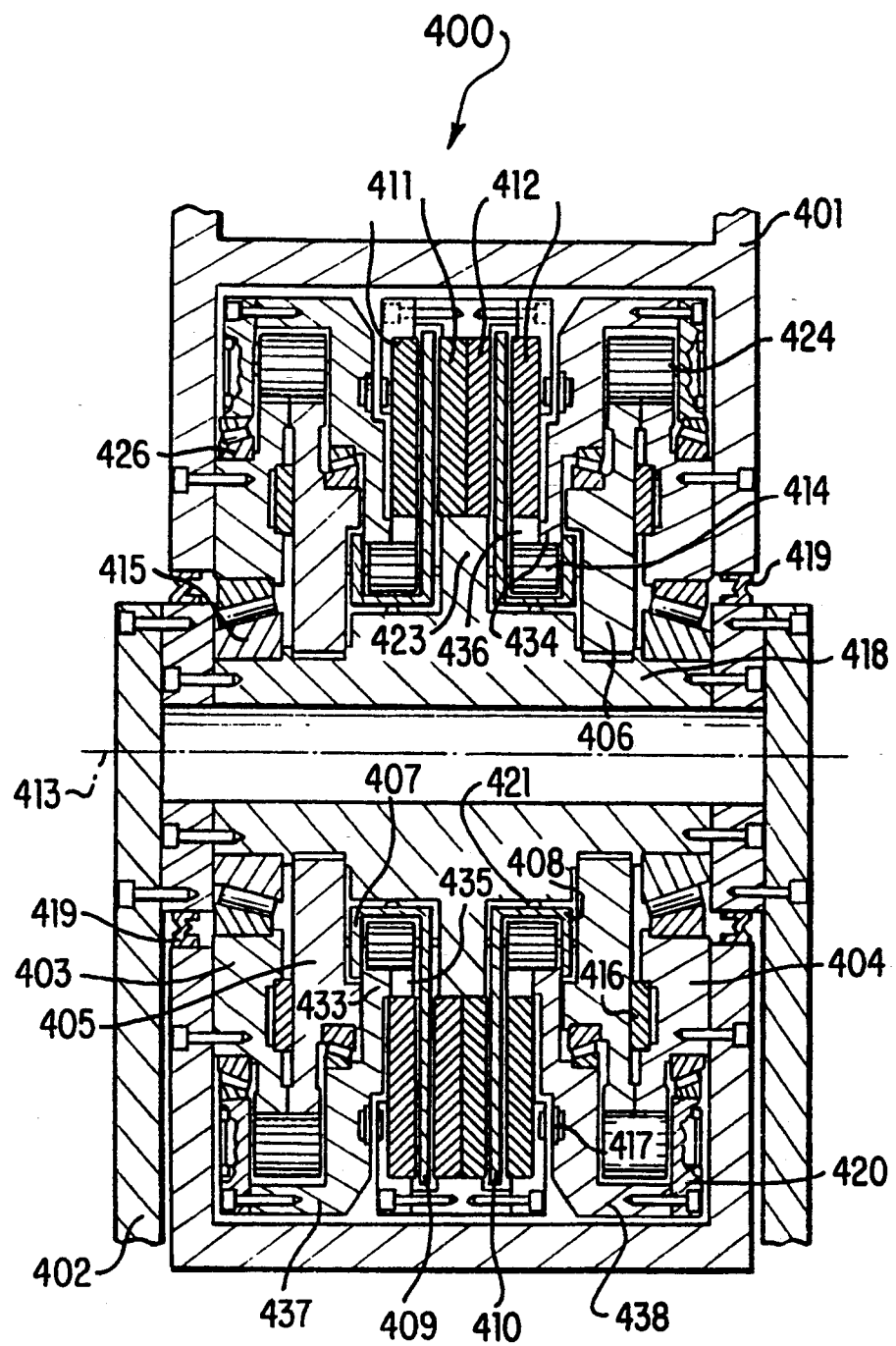
FIG. 10 is a cross-sectional view of an actuator module featuring dual gear train/motor system and mated with two robot members to form an elbow joint, with each gear train/motor system comprising two stages of epicyclic gearing.
Figure 11:
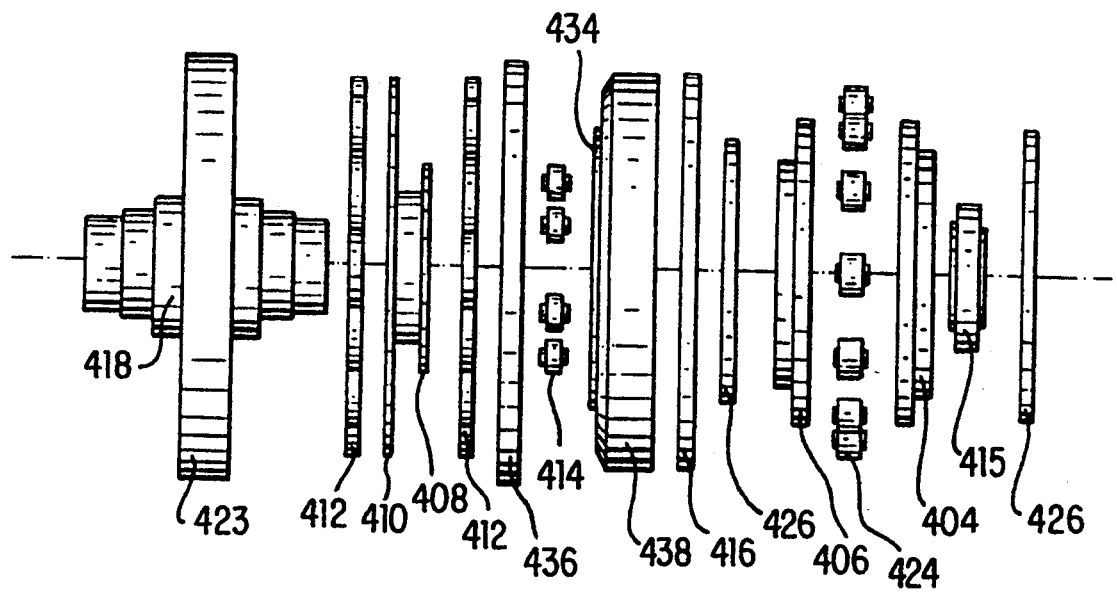
FIG. 11 is an exploded side view of one half of the actuator module of FIG. 10.
Figure 12:
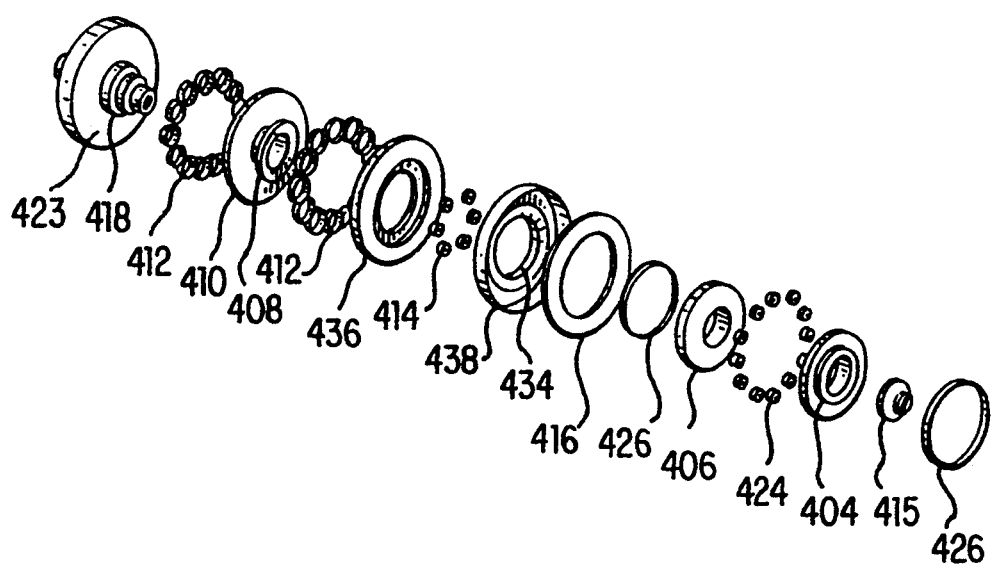
FIG. 12 is an exploded isometric view of one half of the actuator module of FIG. 10.

Actuator module 400, a variation of actuator module 100 having a two-stage Ferguson epicyclic gear train, is shown in FIG. 10, with exploded views of the right half of this configuration given in FIGS. 11 and 12. This configuration provides an improvement over the relative parameters of speed reduction available, offering reduction ratios in the range of 100 to 1000 to 1. Two-stage versions of actuator modules 200 and 300, and their single system counterparts (e.g., actuator module 50), are also possible using similar configurations.

Referring to FIG. 10, the first stage comprises an inner primary base gear pair connected to central shaft 418 and comprising first inner primary base gear 435 and second inner primary base gear 436, an outer primary base gear pair comprising first outer primary base gear 433 and second outer primary base gear 434, first primary planet carrier 407 and second primary planet gear carrier 408, each planet gear carrier 407 and 408 having a plurality of primary planet gears 414 rotatably mounted therein.

The second stage comprises an outer secondary base gear pair connected to robot member 401 and comprising first outer secondary base gear 403 and second outer secondary base gear 404, an inner secondary base gear pair detachably connected to robot member 402 and comprising first inner secondary base gear 405 and second inner secondary base gear 406, first secondary planet gear carrier 437 and second secondary planet gear carrier 438, with each planet gear carrier 437 and 438 having a plurality of secondary planet gears 424 rotatably mounted therein. Inner secondary base gears 405 and 406 may be splined to central shaft 418 for assembly purposes. First secondary planet gear carrier 437 is connected to first outer primary base gear 433 and second secondary planet gear carrier 438 is connected to second outer primary base gear 434. Planet gear carriers 437 and 438 may include annular end plates 420 to form the outer mount for planet gears 424 for ease of assembly. In the embodiment shown, primary base gears 433, 434, 435 and 436 are ring gears while secondary base gears 403, 404, 405 and 406 are sun gears.

The dual motors are integrated with the first stage gearing. First primary planet gear carrier 407 is connected with first motor rotor 409 and second primary planet gear carrier 408 is connected with second motor rotor 410, with motor rotors 409 and 410 being disposed between magnet groups 411 and 412, respectively. Magnet groups 411 and 412 are mounted on motor stator arm 423, which is integrally connected to or formed with inner primary base gears 435 and 436. Motor stator arm 423 may be formed as part of central shaft 418. Possible motors include d.c., brushless d.c., a.c., hydraulic, and pneumatic motors. As in the other embodiments depicted, actuator module 400 is also equipped with brakes 416, position sensors 417 such as encoders, tapered roller bearings 415, needle bearings 421 and seals 419.

As an electromechanical force is generated by the motors, the rotation of the first stage gearing is transmitted to the second stage gearing through secondary planet gear carriers 437 and 438, these being connected to outer primary base gears 433 and 434. The second stage, in turn, imparts relative motion to robot members 401 and 402. Because primary planet gears 414 must run at the relatively high speed of the motors, their mass must be kept as low as possible. Hence, they should be of small diameter to reduce their rotational inertia. Because they are near the low torque end of the motors, lower tooth loads are necessary, meaning that fewer primary planet gears 414 are needed for this stage, that they can be smaller, and that lighter bearings are possible here. This reduces their inertia relative to the drive responsiveness of the actuator as a unit.

The second stage gearing should be more robust in order to carry large torque loads associated with the robot joint. Stiffness may be enhanced here by using more secondary planet gears 424, thicker secondary base gears 403, 404, 405 and 406 without the high cost in drive inertia (because of the lower speeds involved here).

Figure 13:
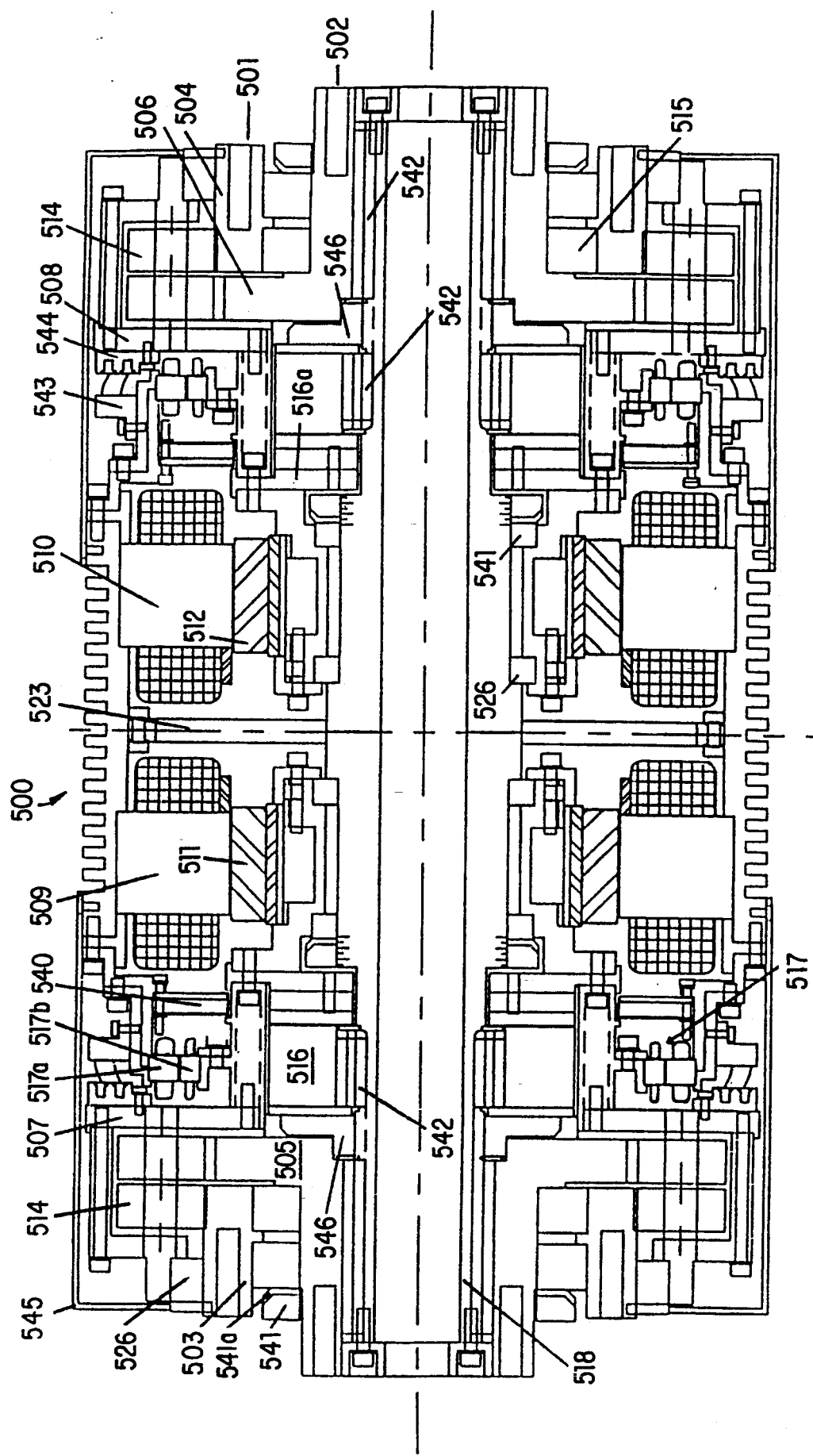
FIG. 13 is a cross-sectional view of the actuator module of the present invention of similar configuration to the actuator module shown in FIG. 2.

Another embodiment of a single stage dual system actuator module of the present invention is illustrated in FIG. 13 as actuator module 500. Actuator module 500 represents a variation of actuator module 100, suitable for the same applications and comprising similar components in a somewhat different configuration. Specifically, actuator module 500 comprises first outer base gear 503, second outer base gear 504, first inner base gear 505, second inner base gear 506, planet gear carriers 507 and 508, and a plurality of planet gears 514 rotatably mounted therein. In the configuration shown in FIG. 13, the base gears 503, 504, 505 and 506 comprise sun gears which rotate within the planet gear carriers 507 and 508. Outer base gears 503 and 504 may be connected directly to robot member 501 and inner base gears 505 and 506 may be connected directly to robot member 502. Inner base gears 505 to 506 are also rigidly attached to central shaft 518, with guidance rings 546 disposed between inner base gears 505 and 506 and the brakes 516.

Brakes 516 are mounted on the central shaft 518 proximate planet gear carriers 507 and 508 for arresting the motion of planet gear carriers 507 and 508. Planet gear carriers 507 and 508 may be fitted with plates 516a for this purpose, as shown in FIG. 513. In the embodiment shown, brakes 516 each comprise a permanent magnet. When no power is supplied to brakes 516, brakes 516 engage plates 516a by means of the permanent magnets, thus preventing planet gear carriers 507 and 508 from moving. Supplying power to the brakes 516 neutralizes the magnetization of the permanent magnets, allowing planet gear carriers 507 and 508 to rotate. In this configuration, brakes 516 are typically not used during operation of the actuator module 500 and may be referred to as "fail-safe" or "parking" brakes. These brakes are engaged to lock the drive train when actuator module 500 is not in use and also when power to the actuator module is unexpectedly cut off. During operation of actuator module 500, "braking" of the drive train is accomplished instead by reverse torquing of the motors.

Motor stators 509 and 510 are rigidly connected to motor stator arm 523. In the configuration shown in FIG. 13, motor stators 509 and 510a comprise armatures. Motor stators 9 and 10 are operatively aligned with motor rotors, which comprise a plurality of permanent magnets in this configuration. Motor rotors 511 and 512 are rigidly connected to planet gear carriers 507 and 508. As in the other embodiments, the operation of the dual motors comprised of motor rotors 511 and 512 and motor stators 509 and 510 causes planet gear carriers 507 and 508 and the planet gears 514 mounted therein to rotate about base gears 503, 504, 505 and 506 thereby generating the relative motion of robot members 501 and 502. A side view of one-half of the Ferguson epicyclic gear train is shown in FIG. 2.

The movement of planet gear carriers 507 and 508 is sensed by position sensors 517. Position sensors 517 are shielded from the magnetic field generated by motor stators 509 and 510 by magnetic shielding 540. In the configuration shown, position sensors 517 comprise resolver rotors 517a mounted on planet gear carriers 507 and 508 operatively aligned with resolver stators 517b mounted on motor stator arm 523. In order to determine the relative position of the planet gear carriers 507 and 508, an electric field is applied to resolver stators 517a. The electric field is then measured at resolver rotors 517b. The resulting information is transmitted to an associated controller via resolver contact rings 544 mounted on planet gear carriers 507 and 508 and resolver brushes 543 mounted on motor stator arm 523.

Motor stator arm 523 forms a housing for the components of actuator module 500, with additional housing members 545 mounted on and extending from motor stator arm 523 to enclose the Ferguson epicyclic gear train. In order to dissipate heat from motor stators 509 and 510, motor stator arm 523 may be provided with fins as shown in FIG. 13.

As in the other configurations, actuator module 500 is equipped with a number of bearings. The principal bearings 515 are mounted between inner base gear 505 and outer base gear 503 and between inner base gear 506 and outer base gear 504 and are held in place by lock nut 541 and lock washer 541a. Additional bearings 526 are provided at other locations as shown in FIG. 13. Brakes 516 and inner base gears 505 and 506 may be held in place on central shaft 518 through the use of keys 542.

TIMKEN tapered roller bearings (Nos. LL 13049 and LL 13010) may be used for bearings (15, 115, 215, 315, 415, 515) while SKF THINLINE TM or KAYDON ball (Nos. KB 020 ARO and KB 055 ARO) bearings may be used for bearings (26, 126, 226, 326, 426, 526). Preferred position sensors (17, 117, 217, 317, 417, 517) include AMERICAN ELECTRONICS 70 PX-1 resolvers and INLAND large bore annular resolvers AEI Model 64PX1. ELECTROID permanent magnet safety brakes (No. CPMF SD-19) have been found suitable for brakes 16. MARTIN SPROCKET epicyclic gear sets may be used for the Ferguson epicyclic gear train for the present invention, with base gears having 60 and 58 teeth used in connection with planet gears having 12 teeth each, yielding a gear reduction ratio of 30:1. In a preferred embodiment, twelve equally spaced planet gears (14, 114, 214, 314, 414, 514) have been used for each planet gear carrier. For the motor, an INLAND rare earth ceramic brushless d.c. electric motor may be used (Model Nos. RBE 4501 A00 or 6201 A00).

The use of superconducting materials may require forced circulation of a cooling medium such as liquid nitrogen. This may also be desirable where rare earth materials or pure copper is used to enhance the magnetic field strength.

Carbon fiber may be used wherever possible to reduce weight. Gears may be made of metal teeth on a ring attached to a carbon fiber disk structure which might then be attached to a metal shaft.

A generalized mechanical architecture will require a system controller of sufficient generality and adaptability to absorb control software which matches the mechanical structure. This system controller must interface with the distributed electronic control packages associated with each actuator module. Each actuator module will be supported by a local (distributed) electronic package with data reduction and local decision-making capability. It must absorb a broad range of signals from the actuator module encoders by means of wiring, fiber optics, light transmission, or radio waves. The electronic package may be built as two independent units normally controlling half of the actuator module but capable of controlling both sides of the actuator if one side of the electronic package fails. Full duality of both the electronic and mechanical components of the actuator modules is desirable to enhance reliability and safety. This can be achieved by using two encoders, two brakes, two armatures, two drive trains, and multiple transducers for current, temperature, strain, and the like.

It will be necessary to design an encoder subsystem to fit between the outer and inner base gears. Otherwise the encoder would be an add-on, reducing the symmetry and compactness of the unit. Preferred encoders include tachometers, resolvers, potentiometers, hall effect sensors, optical encoders, and electrical contact encoders.

Control in the small would require a secondary input between the motor armature and the planet gear carrier. There should be enough space to put a small subsystem (motor and bearings) to control very small motions at that point. It would be carried on that system of robot members as a subsystem.

A particularly simple, strong and light structural interface between the actuator module and the robot members is a bolt circle built into the robot member and attached to the base gear structure. Other quick disconnect interfaces are feasible. In addition, each module should provide for standardized control signal interfaces to a neighboring electronic control module package.

As previously noted, the actuator modules of the present invention, including single system modules such as actuator module 50, dual system, single stage modules such as actuator modules 100, 200, 300 and 500, and dual system, dual stage modules such as actuator module 400, may be used as building blocks for a variety of robot architectures. Although for most applications these three types of modules, as exemplified by actuator modules 50, 100 and 400, are interchangeable, only certain embodiments will be referred to for discussion purposes.

Actuator modules 100, 200 and 300 (and also 400 and 500) may be used to drive all possible 1-DOF joints (6) which may be called "elbows". The possible variations are represented in FIGS. 14a–f, showing the use of actuator modules 100, 200 and 300 to induce the relative motion of robot members (101, 201, 301 and 102, 202, 302). In the configuration shown in FIG. 14a, actuator module 100 is contained in the volume of robot member 101 while robot member 102 forms a yoke on the outside of robot member 101. It forms a compact, simple assembly allowing up to 270° of rotation.

Figure 14A:
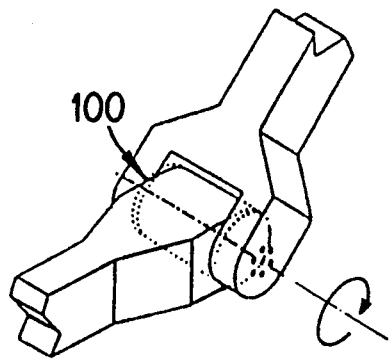
FIGS. 14a-f are 1-DOF robot elbow joints formed using actuator modules of the present invention.
Figure 14B:
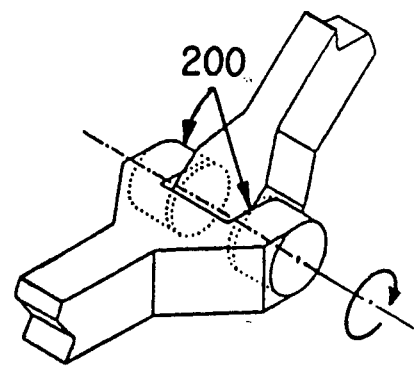
Figure 14C:
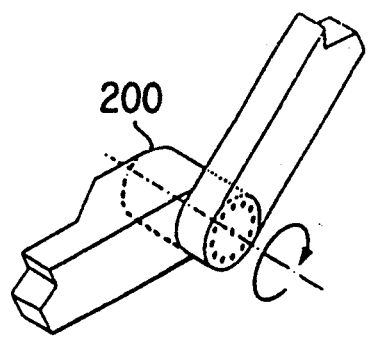

In the configuration of FIG. 14b, actuator module 200 is divided into separate halves (actuator module 50) and placed in each branch of a yoke. The result is a compact simple assembly, providing 270° of rotation and being somewhat more rugged than the configuration of FIG. 14a.

In the configuration of FIG. 14c, actuator module 200 is incorporated in overlapping robot members, which allows the continuous rotation of two robot members as in the elbow shown, in the base robot in a forearm, or as the last driver before the robot end-plate. This configuration is not as rugged as those of FIGS. 14a and 14b for the same weight, but is relatively compact for exceptional dexterity.

Figure 14D:
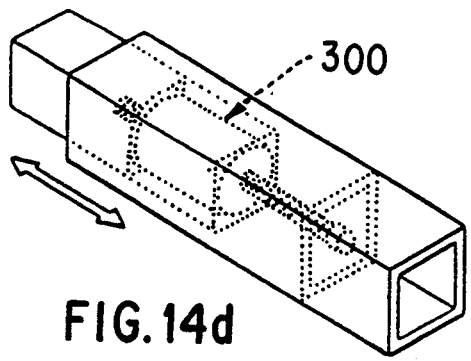

FIG. 14d is a prism (linear) joint. Here, actuator module 300 drives a slider joint by means of a built-in ballscrew.

Figure 14E:
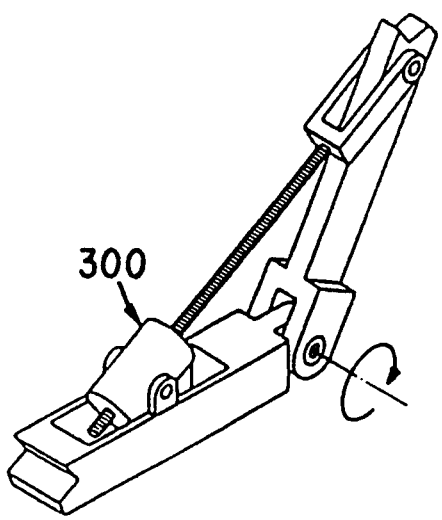

In the configuration of FIG. 14e, actuator module 300 acts as an inverted slider crank mechanism in the same fashion as hydraulic pistons are used. This system provides about 140° of rotation. It is very stiff in the direction of rotation and can be used to resist large forces (as in backhoes or heavy lifting systems). These systems could be doubly actuated but it would be difficult since the ballscrew is largely non-back-driveable.

Figure 14F:
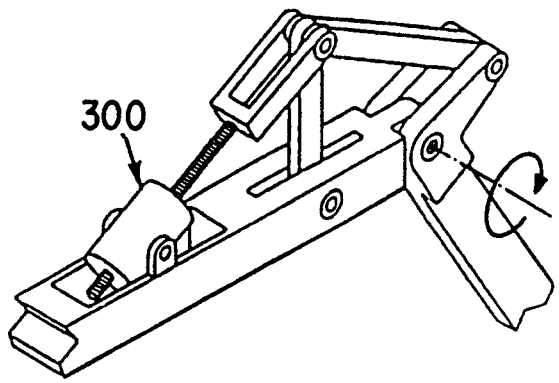

FIG. 14f is actuator module 300 with a four-bar mechanical amplifier, which amplifies the output of the actuator to make 270° of joint rotation possible. The system can be made very stiff but at the penalty of more bearings and robot members (more weight) and therefore it is less compact.

Actuator modules 100 and 300 may be used to drive 2-DOF actuated "knuckles". Knuckles combine the relative motion of three neighboring robot members in series. The three examples shown in FIGS. 15a–c are general, preserving all the robot member parameters (3) between the joint centerlines. The three examples shown in FIGS. 15a–c demonstrate three isometric physical configurations where the revolute joints are perpendicular to each other. Because the axes intersect at 90° in the configurations of FIGS. 15a–c, there are no geometric design parameters.

FIG. 15a is two revolute joints in series. In this configuration, an open chain of robot members 101a, 102a and 103a is joined by two revolute joints (actuator module 100) whose centerlines are located relative to each other by three robot member parameters. A common condition in robots is to have the two centerlines parallel (only one robot member parameter remains). In this case, if robot member 101a is fixed, it is possible to use a point in robot member 130a to track an arbitrary planar curve.

FIG. 15b shows the use of one revolute and one prism in series. This results in a common pair combining a revolute (actuator module 100) and a slider (actuator module 300) in a series, especially if the joint centerlines intersect at 90° which reduces the number of robot member parameters for design to zero.

FIG. 15c is two prisms in series. It is possible to use an actuator module (actuator module 300) to provide linear motion between robot members 1 and 2 and robot members 2 and 3. When the angles between the joints is 90°, Cardan coupling between offset rotating shafts results. This is frequently used as an x-y support structure in gantry robots. Extending this to three joints creates the common x-y-z system as used in the IBM robot. If all three axes intersect, the number of design parameters has been reduced to zero.

Figure 16C:
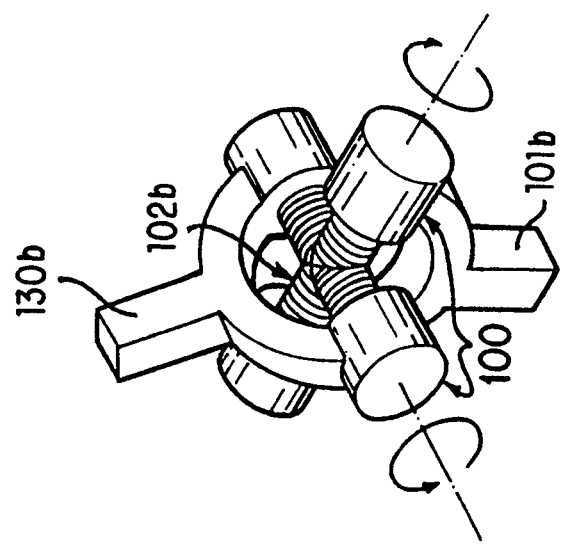
FIG. 16a-c are 2-DOF robot knuckle joints with perpendicular axes utilizing actuator modules of the present invention.
Figure 16B:
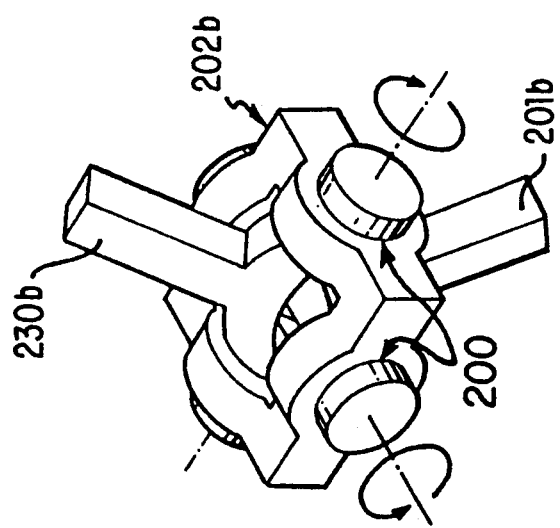
Figure 16A:
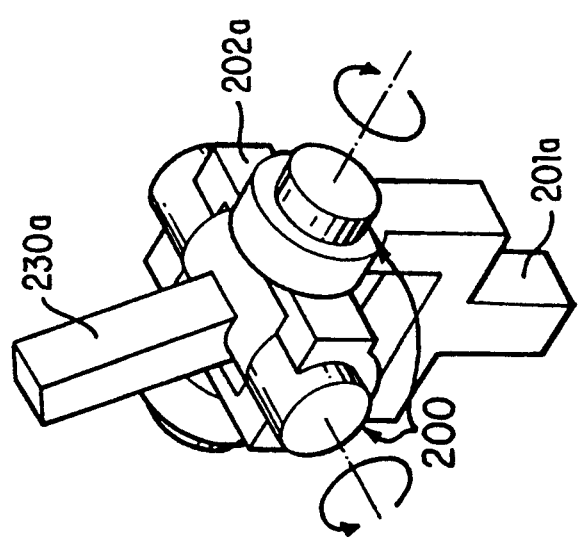

FIG. 16a is a 2-DOF gimbal in rotation. When the two serial revolute joint centerlines intersect at 90°, the result is a special geometry frequently found in robots. If the first joint uses two actuator module 200 halves (actuator module 50) in a yoke (robot member 201a) and the second joint uses two actuator module 200 halves in an inner box structure (robot member 202a), the result is a 2-DOF gimbal structure. The joint rotations between robot members 202a and 230a generally cannot exceed 140°.

FIG. 16b is a knuckle joint with an external frame. This configuration features four actuator module 200 halves in an external box frame (robot member 202b), each pair (on intersecting centerlines at 90°) driving an internal yoke on robot members 201b and 230b. The operating joint rotations cannot exceed 140°. This system structure can be made compact and exceptionally rigid and isometric. Each degree-of-freedom could be driven in-parallel by an actuator module model 300 if drive stiffness is a priority.

FIG. 16c is an interior cross knuckle joint, comprising four actuator modules 100 attached to external yokes 101b and 130b driving an internal cross-member 102b (at 90° similar to a universal joint found on vehicle drive shafts) with a rotation cone of action approaching 270°. This system is exceptionally compact but not as rugged as the elbow joints of FIGS. 14a–f.

The actuator modules of the present invention may be used to create a rugged parallel structure robot which can follow an arbitrary planar curve. This 2-DOF parallel planar motion, depicted in FIGS. 17a and b, is achieved by using actuators near the base joints of the system in order to reduce the moving mass of the system.

Figure 17A:
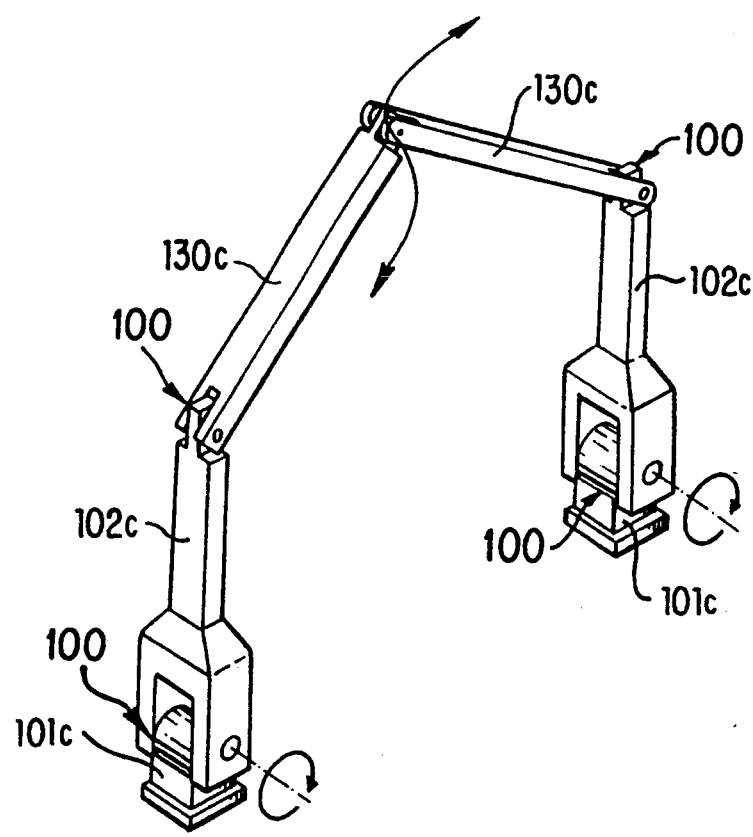
FIG. 17a and 17b are 2-DOF robot planar curve robot structures utilizing actuator modules of the present invention in parallel.

FIG. 17a is a 2-DOF crank-operated planar curve structure. This parallel structure uses rotational inputs and combines two sets of robot members to track the same point in order to form a parallel structure. Each set of robot members comprises a fixed robot member 101c, a lower robot member 102c and an upper robot member 130c, with actuator modules 100 being located at the joint formed by robot members 101c and 102c and the joint formed by robot members 102c and 130c. Actuator modules 100 are employed at the latter location for antagonism or force level rotation control. This parallel structure is normally more rugged and involves less moving mass than the elementary serial structure. For example, upper robot members 130c experience forces primarily along their center lines (two force members) which they can easily resist with small mass content.

Figure 17B:
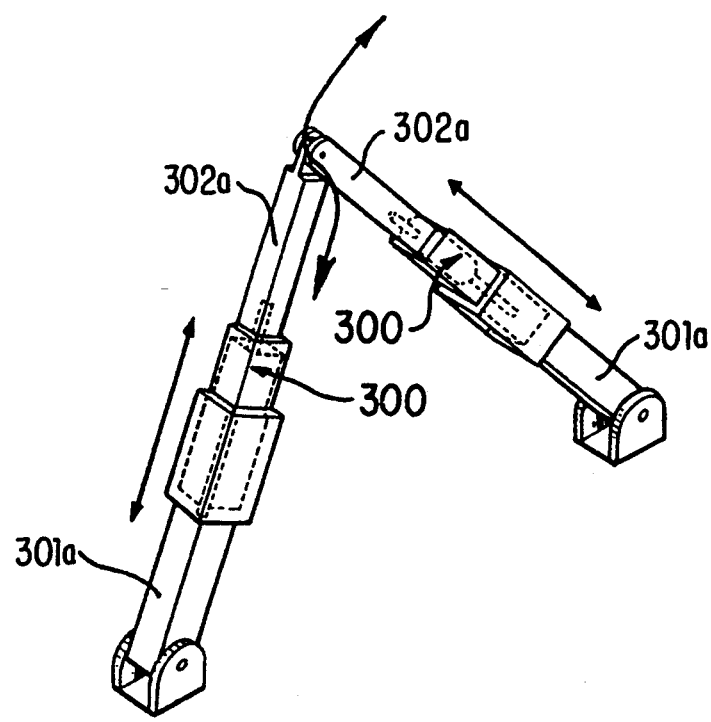

FIG. 17b is a 2-DOF slider-operated planar curve structure, a parallel structure using translational inputs. This configuration comprises two serial systems such as those shown in FIG. 15b combined to trace the same planar curve, a parallel structure having an actuator module 300 joining members 301a and 302a in each side of the structure. This type of structure is exceptionally stiff relative to forces acting on the tracing point.

Figure 18A:
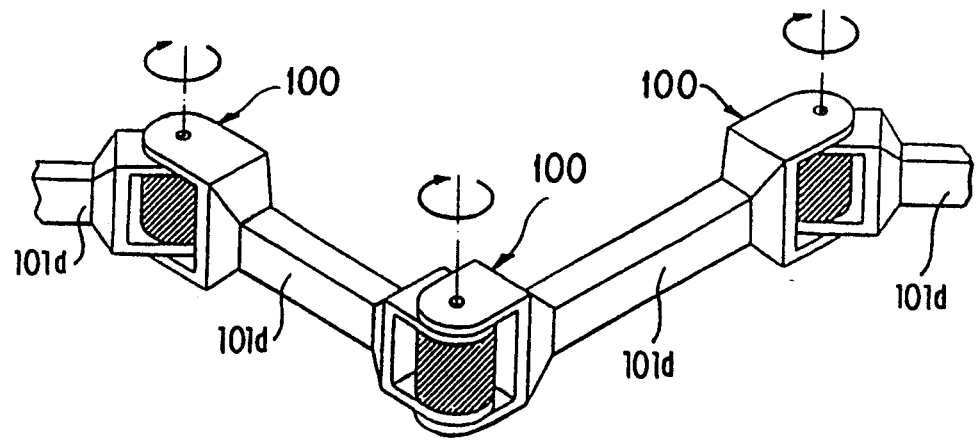
FIGS. 18a and 18b are 3-DOF serial planar robot structures utilizing actuator modules of the present invention.
Figure 18B:
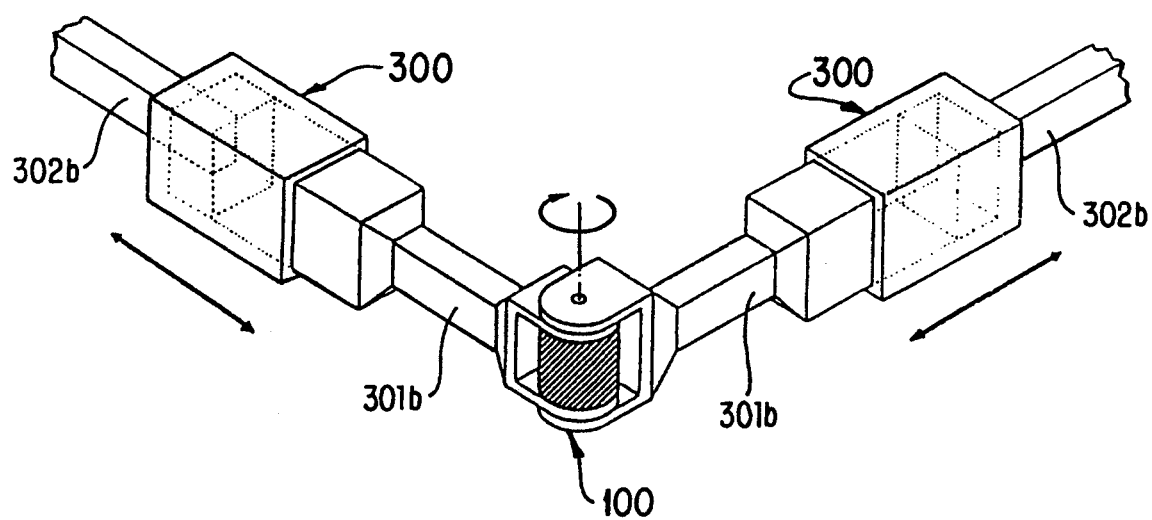

FIGS. 18a and 18b are 3-DOF serial planar structures based upon the present invention. The relative motion provided by a plane joint (FIG. 14f) is the same as the three degrees-of-freedom which result when two flat surfaces move relative to each other (two in translation and one in rotation). This type of motion is achieved in the configurations of FIGS. 18a and b and 19a and b.

FIG. 18a is a 3-DOF planar serial structure based upon three revolute joints in series. In this configuration, four robot members 101d are joined by three rotary joints with parallel centerlines, each driven by actuator module 100.

FIG. 18b is a one revolute and two linear (prismatic) joints. Here, four robot members 301b are joined by two linear joints (actuator module 300) whose centerlines intersect the rotary joint centerline at 90°, with the rotary joint being driven by actuator module 100.

Figure 19A:
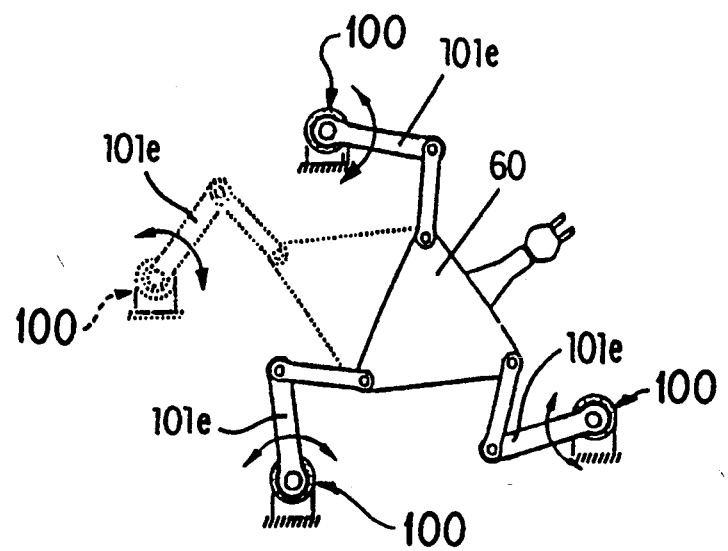
FIGS. 19a and 19b are 3-DOF parallel planar robot structures utilizing actuator modules of the present invention.

FIGS. 19a and b are 3-DOF parallel planar structures based upon the present invention. FIG. 19a is a 3-DOF parallel planar structure with crank inputs (rotary actuators). This configuration features a rigid triangle 60 with each apex driven by a separate rotary crank (actuator module 100) through a connecting binary robot "legs" 101e. This is the ideal totally parallel planar mechanical structure. Note that all joint axes must be parallel to provide planar motion. Because all the actuators are on the fixed base, very little mass is moving in this system. Only the cranks experience significant bending deflections. The rest of the system is remarkably rigid against normal planar forces. The concept of "bracing" in the form of extra supporting structures (usually lightweight and used only on demand) can be used to stiffen an otherwise weak serial structure. The concept can be best understood in terms of parallel structures where it can be thought of as a part of an integrated and balanced design. Here, an optional leg 101e (depicted by a dotted line) may be added to allow a full time utilization of an extra input driver system (in-parallel) for improved force control. Control software then can use any three legs or all four if necessary to provide a significant improvement on the systems tracking capability under force disturbances.

Figure 19B:
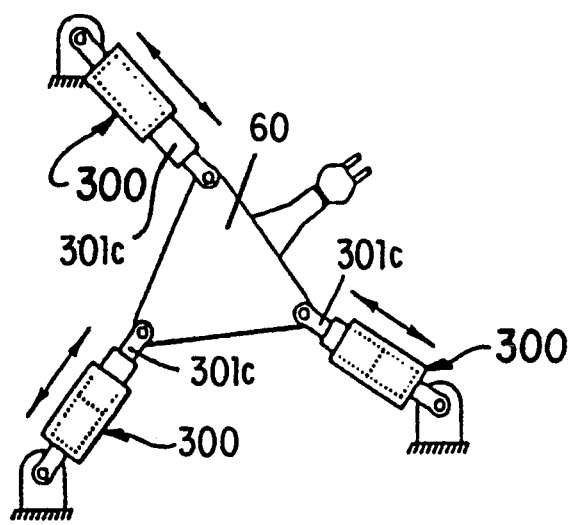

FIG. 19b is a 3-DOF parallel planar structure with slider inputs (linear actuators). In this case, the rotary actuation system of FIG. 19a is replaced by three linear actuators (actuator module 300). This forms a completely parallel planar 3-DOF robot system which is exceptionally rugged. Again, an extra leg (in-parallel) can be added for improved force control.

Figure 20A:
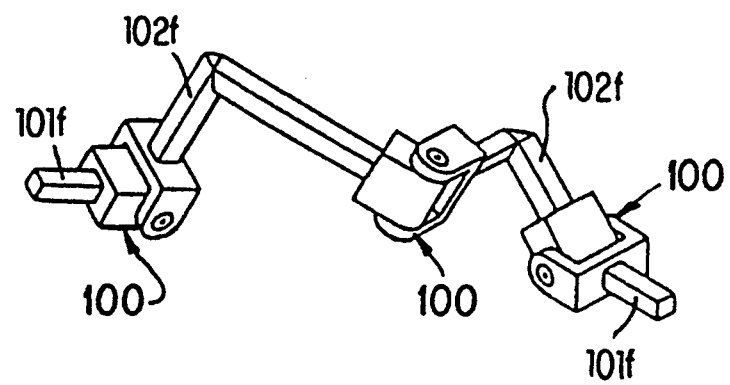
FIGS. 20a-c are 3-DOF serial spherical robot shoulder joints utilizing actuator modules of the present invention.
Figure 20B:
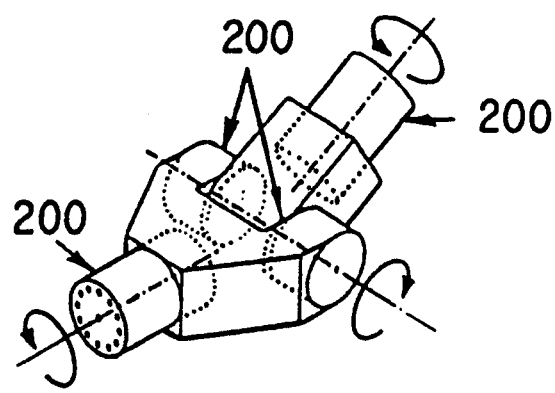
Figure 20C:
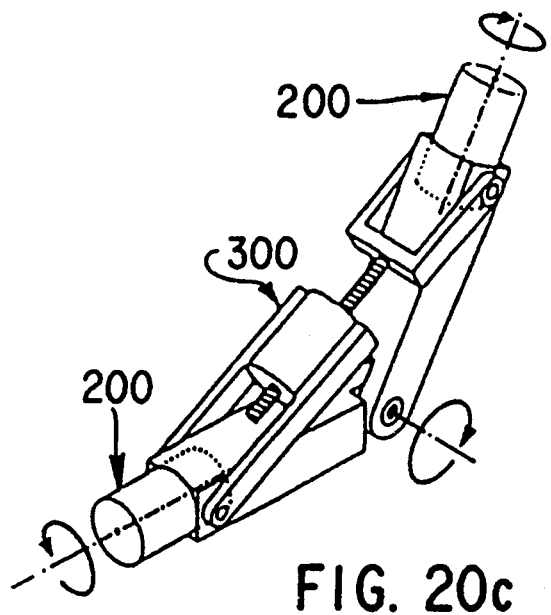

FIGS. 20a–c are 3-DOF serial spherical shoulder joints, based on the present invention. The simplest spherical motion is provided by a ball-and-socket joint. But this type of joint cannot be driven directly. FIGS. 20a–c show how to create spherical motion by using the actuator modules of the present invention.

In the configuration of FIG. 20a, three rotary joints are connected in series, with four robot members 101f being joined by rotary joints driven by actuator modules 100 whose centerlines all intersect at the center of a sphere. Because of the large twisting moments involved, this structure is difficult to make rugged. If the angle between the succeeding axes is 90°, the system results in a common wrist configuration.

FIG. 20b is a 3-DOF compact shoulder (or wrist) joint. In this configuration, actuator module 200 is positioned on the base which drives a yoke (two actuator module 200 halves at 90° to the base centerline) which then holds actuator module 200 inside the yoke. This is a very compact and rugged serial shoulder. The same series of modules can be used as a lightweight wrist at the end of a robot. This configuration is subject to the constraint that all axes must intersect to provide spherical motion.

FIG. 20c is a 3-DOF compact spherical shoulder with a central joint driven in parallel. This configuration comprises the shoulder joint of FIG. 20b with the yoke joint driven in-parallel by actuator module 300. This makes a very rugged and stiff shoulder, although not as compact.

A completely parallel 3-DOF spherical structure may also be formed using the present invention. This configuration may be thought of as the planar system shown in FIG. 18a wrapped on a sphere. If three sets of serial robot members are used to drive the same output robot member (robot member 4), then a completely parallel shoulder module results where all the drivers (actuator module 100) can be located on the fixed robot member. A preloaded ball and socket can be maintained in the center of the sphere for load-carrying capacity if desired. If all the fixed axes of the shoulder are concentric, a wrist is formed which can be driven through torque tubes along the centerline of the robot forearm.

The present invention may be utilized to provide a general mechanical architecture by combining a series of robot members with 1-DOF joints in-between. This means that the weight of most of the actuators is carried by the moving structure. All forces, errors, deformations, etc., are additive in a serial structure making it the least rugged and least precise of all possible architectures. To be general, each robot member will contain two joint centerlines (having an offset, a twist angle and a distance along the robot member, i.e., three parameters). In most robots, the only variable is the offset between the joints when they are parallel or the twist angle is fixed at 90° when they intersect. The reason serial structures are used is that they provide a maximum level of dexterity, excellent obstacle avoidance, simplicity of force analysis and design, minimal intrusion into their work space, small footprint, compact stowage, etc.

A variety of architectures may be achieved driven by the actuator modules of the present invention, including Stewart platforms, dual arms, hands and walking machines. A six-legged Stewart platform may be constructed with each leg of the platform containing a actuator module 300 actuator as a driver. Each leg could be driven at the base by a revolute with an elbow joint along the leg and a ball-and-socket joint where the leg joins the platform. This device can be miniaturized to make a micromanipulator. A three-legged Stewart platform may be constructed, having each leg driven by two revolute joints at the base in a gimbal format and containing an elbow and spherical joint at the top where it joins the platform. Dual arms may be constructed such that the object is held by two 6-DOF serial robots to provide a dual or parallel structure with an excess of six inputs. A robot hand based on the present invention may be configured with essentially identical fingers (three or more) used to control an object at its finger tips. Each finger may be driven by two or more actuators in series depending on the level of force control desired. Walking machines composed of two or more identical serial legs with various numbers of drivers may also be based on the present invention.

Hybrid structures based on the present invention may be formed by combining structural modules of one, two or three degrees-of-freedom in a larger system. This level of modularity allows for optimum design of the individual modules leaving the system design (with much fewer parameters) to a later stage in the development process. A dynamic model for a manipulator structure may be composed of a selection of parallel-driven modules (elbows, knuckles, wrists, shoulders, etc.) Once this level of modeling is achieved, the hybrid structure can be considered as a substructure of a parallel structure.

Figure 21:
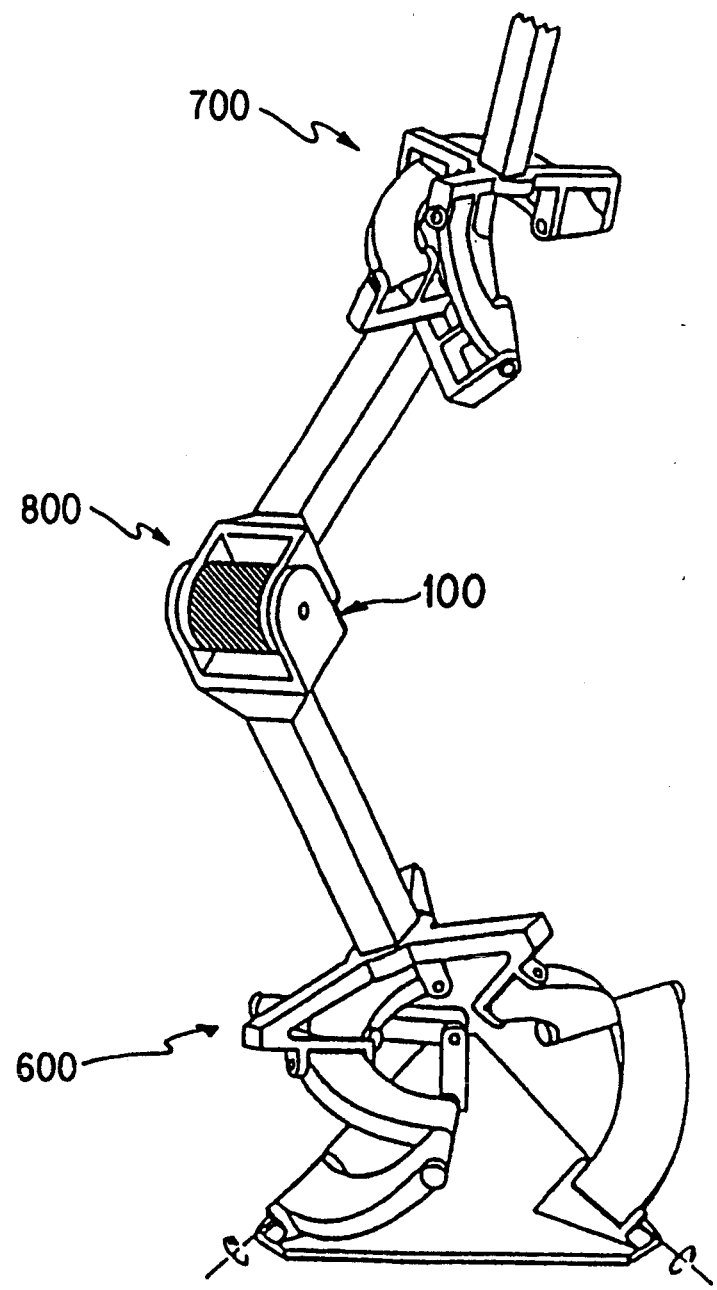
FIG. 21 is a general hybrid robot manipulator chain utilizing actuator modules of the present invention.

Examples of such hybrid structures include 7-DOF modular arms, gantry systems, 9-string manual controllers, and snake robots. A 7-DOF modular arm may be formed by a 3-DOF shoulder 1 and a 3-DOF wrist 2 separated by a 1-DOF elbow 3, as shown in FIG. 21. Gantry systems may be formed with the first 2-or 3-DOF as rather long linear joints to form the gantry. Suspended below this x-y platform is a 4- to 6-DOF arm. The combination allows coverage of a large work volume. A 9-string manual controller involves three modules attached to a handgrip at three points (in-parallel), with each module constrained by three strings to form a tetrahedron. One embodiment of a snake robot involves 2-DOF serial knuckles combined in a series of multiple modules. Another embodiment involves a series of 3-DOF shoulders (the first is parallel, the rest are serial) to form a system of four modules and a total of 14 DOF.

Several scales of input may be mixed to govern the total motion of a robot system. To be effective, the same number of inputs (six or more) must occur at each scale. The large motion might be thought to be at scale 1. The motion of dexterous fingers is at approximately a 10% scale relative to the scale of the human arm. Deformations are of the scale of 1%; hence, a set of inputs to match this would enhance precision and resolution. Finally, problems of electronic drift, temperature, etc., might be taken care of by a 0.1% scale of inputs. This would then comprise a 4-layered control system.

Where a stable reference base is required within a large work volume while performing quite delicate and precise small-scale tasks, then a large 6-DOF transporting arm may be combined with a lightweight precision manipulator, in series, to make what is called a "cherry picker". This scale combination allows a user to write, paint, and carve within a relatively large work volume without the need to move the shoulder.

Micromanipulators, comprising parallel 6-DOF small motion devices, may be attached to the end of the robot to provide a high resolution vernier motion system for enhanced precision and disturbance rejection.

For control-in-the-small, a series of small scale inputs (say at the 1% scale) may be distributed throughout the structure for a generalized capability for improved precision and disturbance rejection.

The foregoing description of the invention has been directed to a particular embodiment for purposes of explanation and illustration. It will be apparent, however, to those skilled in this art that many modifications, additions and deletions may be made without departing from the essence of the invention. It is the applicant's intention in the following claims to cover all equivalent modifications and variation as fall within the scope of the invention.

What is claimed is:

1. An actuator module for inducing motion of a first robot member relative to a second robot member, the actuator module comprising a Ferguson epicyclic gear train, an integral motor and integrated control means, the gear train comprising:
   a first sun gear connected to the first robot member and disposed substantially perpendicular to a central rotational axis;
   a second sun gear connected to the second robot member and disposed substantially perpendicular to the central rotational axis;
   a planet gear carrier disposed substantially perpendicular the central rotational axis;
   a plurality of planet gears rotatably mounted in the planet gear carrier and adapted to rotate outside the sun gears and to mesh with the sun gears;
   a central shaft about which the planet gear carrier rotates, the central shaft being substantially aligned with the central rotational axis.

2. The actuator module of claim 1, the motor comprising a motor stator connected to the second sun gear and motor rotor connected to the planet gear carrier and disposed adjacent the motor carrier.

3. The actuator module of claim 2, the motor stator comprising a plurality of magnets and the motor rotor comprising an armature.

4. The actuator module of claim 2, the motor rotor comprising a plurality of magnets and the motor stator comprising an armature.

5. An actuator module for inducing linear motion of a first robot member relative to a second robot member along a central rotational axis, the actuator module comprising a Ferguson epicyclic gear train, an integral motor and integrated control means, the gear train comprising:
   a first base gear connected to the first robot member and disposed substantially perpendicular to the central rotational axis;
   a second base gear disposed substantially perpendicular to the central rotational axis;
   a planet gear carrier disposed substantially perpendicular the central rotational axis;
   a plurality of planet gears rotatably mounted in the planet gear carrier and adapted to mesh with the first and second base gears;
   a central shaft about which the planet gear carrier rotates, the central shaft being substantially aligned with the central rotational axis.

6. The actuator module of claim 5, the central shaft being connected to one of the base gears and being adapted to mesh with a screw means, the screw means being connected to the second robot member and being adapted to advance the second robot member along the central rotational axis relative to the first robot member as the central shaft rotates about the screw means.

7. An actuator module for inducing motion of a first robot member relative to a second robot member, the actuator module comprising a Ferguson epicyclic gear train, at least two integral motors and control means, the gear train comprising:
   a first base gear connected to the first robot member and disposed substantially perpendicular to the central rotational axis;
   a second base gear disposed substantially perpendicular to the central rotational axis;
   a planet gear carrier disposed substantially perpendicular the central rotational axis;

a plurality of planet gears rotatably mounted in the planet gear carrier and adapted to mesh with the first and second base gears;

a central shaft about which the planet gear carrier rotates, the central shaft being substantially aligned with the central rotational axis.

8. The actuator module of claim 7, wherein the central shaft is rigidly connected to one of the robot members.

* * * * *